(12) United States Patent
Lee et al.

(10) Patent No.: US 10,635,232 B2
(45) Date of Patent: Apr. 28, 2020

(54) MOBILE APPARATUS DISPLAYING END EFFECT AND CONTROL METHOD THEREOF

(71) Applicant: Samsung Electronics Co., Ltd., Suwon-si, Gyeonggi-do (KR)

(72) Inventors: Ho-Young Lee, Seoul (KR); Jee-Yeun Wang, Seoul (KR); Jae-Myoung Lee, Seoul (KR); Chul-Ho Jang, Seoul (KR); In-Won Jong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/429,878

(22) Filed: Jun. 3, 2019

(65) Prior Publication Data

US 2019/0286275 A1 Sep. 19, 2019

Related U.S. Application Data

(63) Continuation of application No. 16/020,468, filed on Jun. 27, 2018, now Pat. No. 10,310,665, which is a (Continued)

(30) Foreign Application Priority Data

Nov. 30, 2012 (KR) ........................ 10-2012-0138444

(51) Int. Cl.
*G06F 3/041* (2006.01)
*G06F 3/0488* (2013.01)
*G06F 3/01* (2006.01)

(52) U.S. Cl.
CPC ............ *G06F 3/0416* (2013.01); *G06F 3/017* (2013.01); *G06F 3/0488* (2013.01)

(58) Field of Classification Search
CPC ................ G06F 3/0485; G06F 3/0488; G06F 2203/04803; G06F 2203/04806;
(Continued)

(56) References Cited

U.S. PATENT DOCUMENTS 8,532,712 B2 9/2013 Jang
9,766,718 B2 9/2017 Lazaridis et al.
(Continued)

FOREIGN PATENT DOCUMENTS

CN 101542424 A 9/2009
EP 2 462 501 6/2012
(Continued)

OTHER PUBLICATIONS

European Examination Report dated Sep. 3, 2019, issued in European Application No. 13195069.3-1231 / 2738663.
(Continued)

*Primary Examiner* — Christopher E Leiby
(74) *Attorney, Agent, or Firm* — Jefferson IP Law, LLP

(57) ABSTRACT

A method of controlling a mobile apparatus to display an end effect is provided. The method includes displaying at least one object on a first layer on a touch screen, converting the at least one object in response to a first gesture that converts the at least one object, detecting that the conversion for the at least one object is ended, and displaying an end effect, which represents a message saying that the at least one object to be converted does not exist anymore or represents additional information, on the touch screen.

20 Claims, 23 Drawing Sheets

Related U.S. Application Data continuation of application No. 15/608,085, filed on May 30, 2017, now Pat. No. 10,048,800, which is a continuation of application No. 14/092,218, filed on Nov. 27, 2013, now Pat. No. 9,671,891.

(58) Field of Classification Search
CPC ......... H04M 1/72544; H04M 1/72547; H04M 1/72561; H04M 1/72522; H04M 2250/22; H04M 2250/12
See application file for complete search history.

(56) References Cited

U.S. PATENT DOCUMENTS

| | | |
|---|---|---|
| 2008/0168404 A1 | 7/2008 | Ording |
| 2009/0070711 A1 | 3/2009 | Kwak et al. |
| 2010/0199180 A1 | 8/2010 | Brichter |
| 2011/0001709 A1 | 1/2011 | Wang |
| 2011/0055752 A1 | 3/2011 | Rubinstein et al. |
| 2012/0066621 A1 | 3/2012 | Matsubara |
| 2012/0066627 A1 | 3/2012 | Furukawa et al. |
| 2012/0066644 A1 | 3/2012 | Mizutani et al. |
| 2012/0086722 A1 | 4/2012 | Miyazawa et al. |
| 2012/0266103 A1 | 10/2012 | Shah |

FOREIGN PATENT DOCUMENTS

| | | |
|---|---|---|
| JP | 2009-258975 A | 11/2009 |
| JP | 4743919 A | 8/2011 |
| JP | 2012-63859 A | 3/2012 |
| JP | 2012-63860 A | 3/2012 |
| JP | 2012-63862 A | 3/2012 |
| JP | 2012-83878 A | 4/2012 |
| KR | 10-2008-0011954 A | 2/2008 |
| KR | 10-2009-0024594 A | 3/2009 |
| WO | 2011/059556 A1 | 5/2011 |

OTHER PUBLICATIONS

When Scrolling is Performed in jQuery, There are Several Series Displayed, webOpixel, Mar. 8, 2012, http://www.webopixel.net/javascript/538.html.
Chinese Office Action dated Jul. 31, 2017, issued in the Chinese Application No. 201310632652.2.
Japanese Office Action dated Aug. 29, 2017, issued in the Japanese Application No. 2013-248993.
European Search Report dated Oct. 5, 2017, issued in the European Application No. 13195069.3.
Korean Office Action dated Apr. 18, 2019, issued in Korean Application No. 10-2012-0138444.
Korean Examination Report dated Dec. 30, 2019, issued in Korean Application No. 10-2012-0138444.

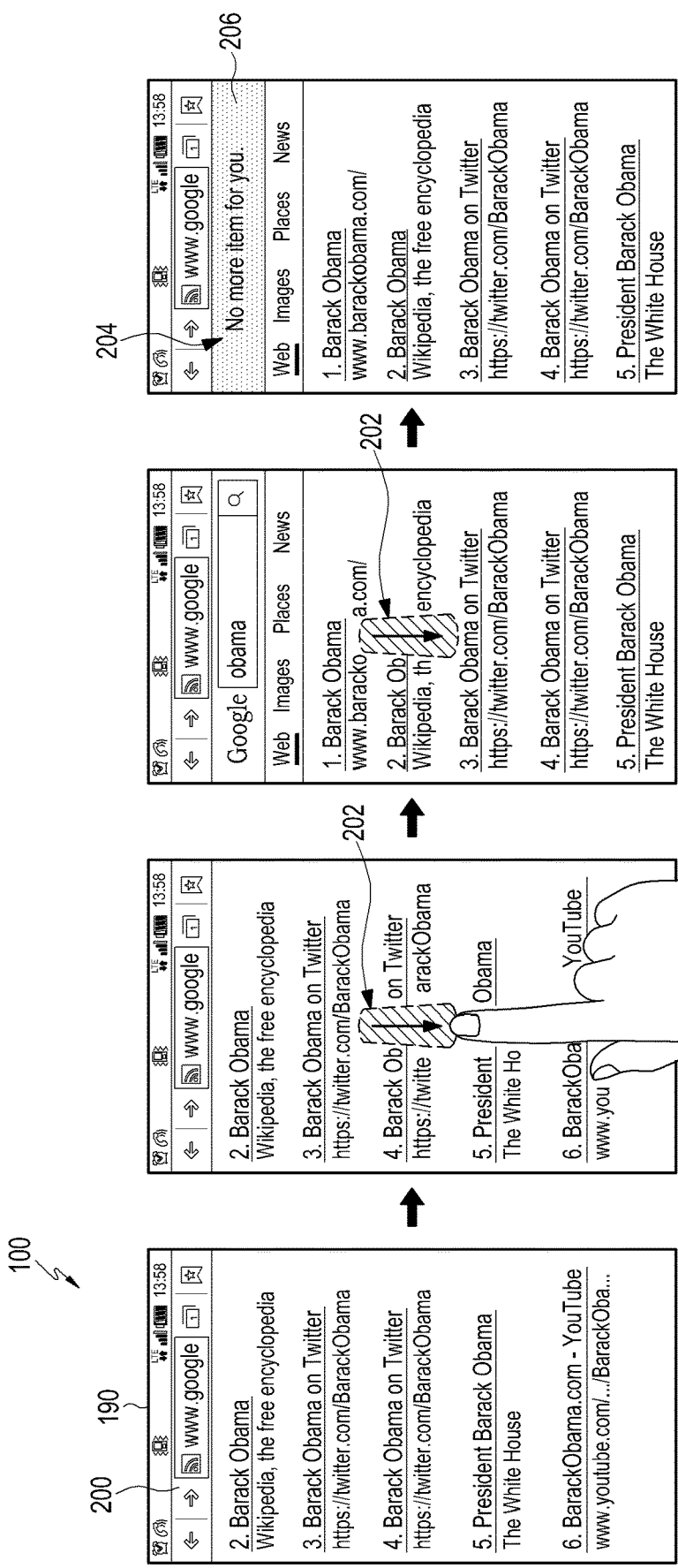

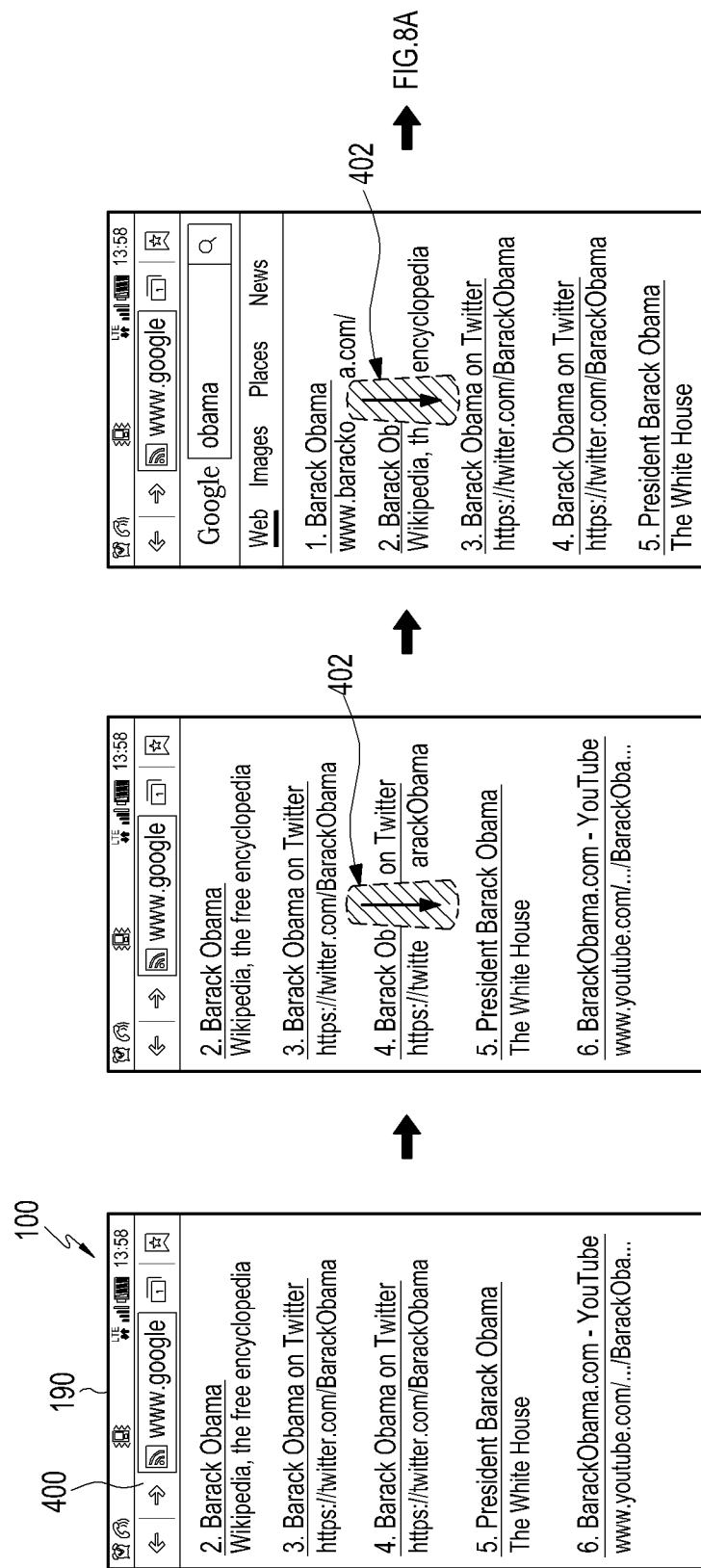

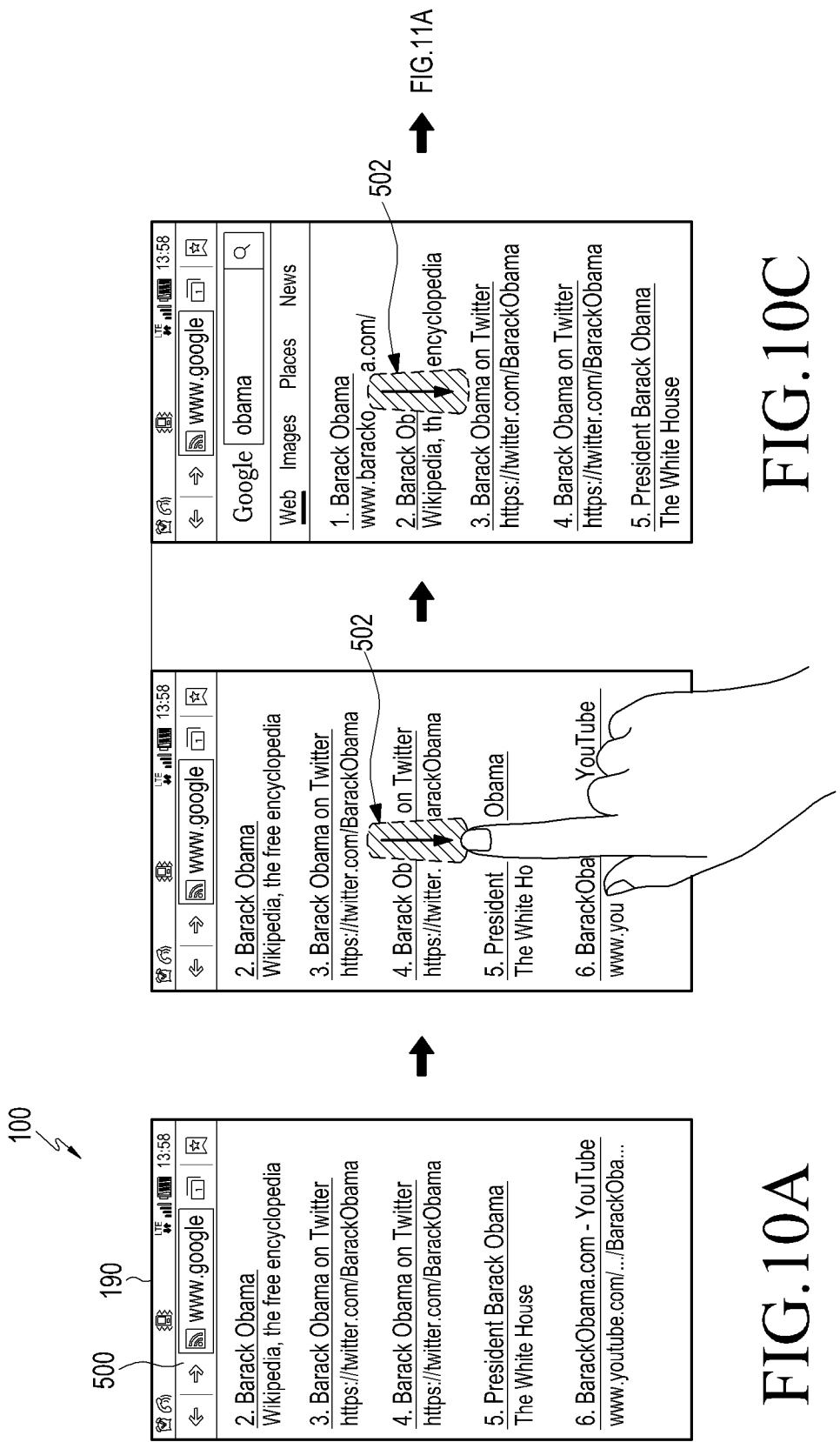

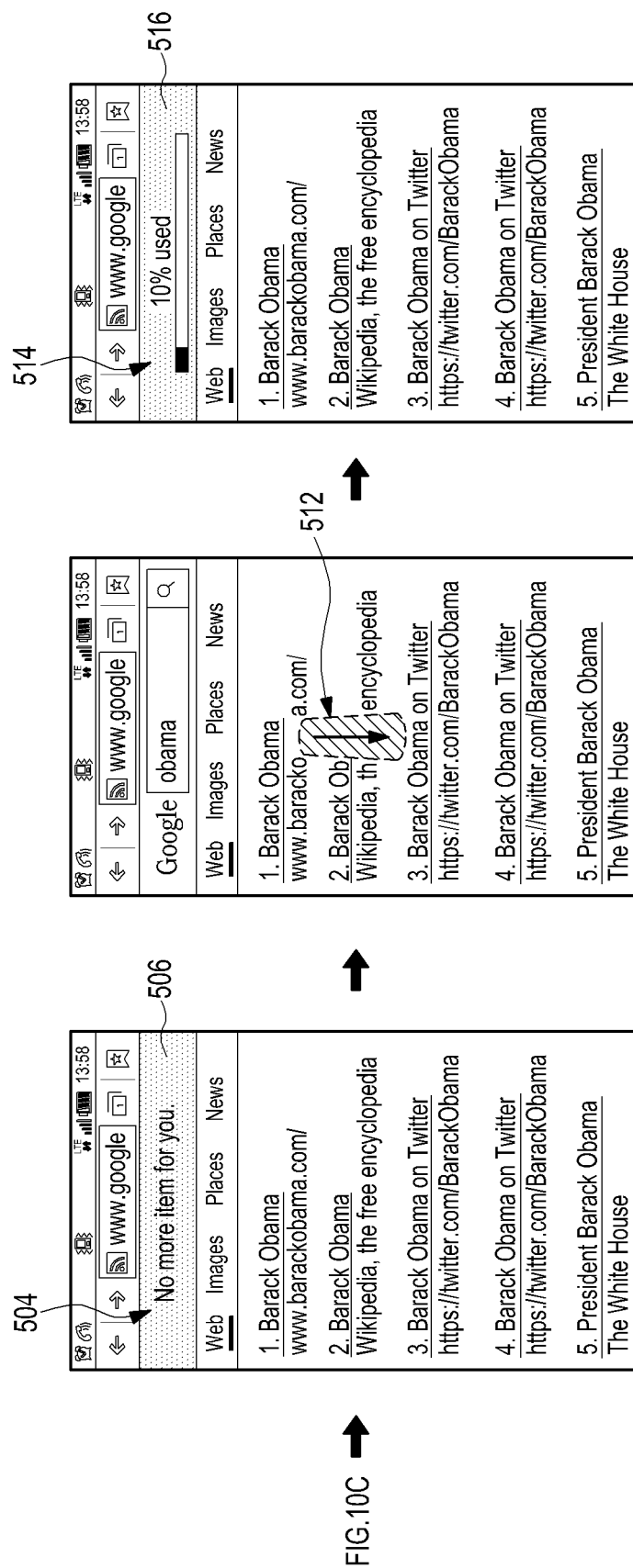

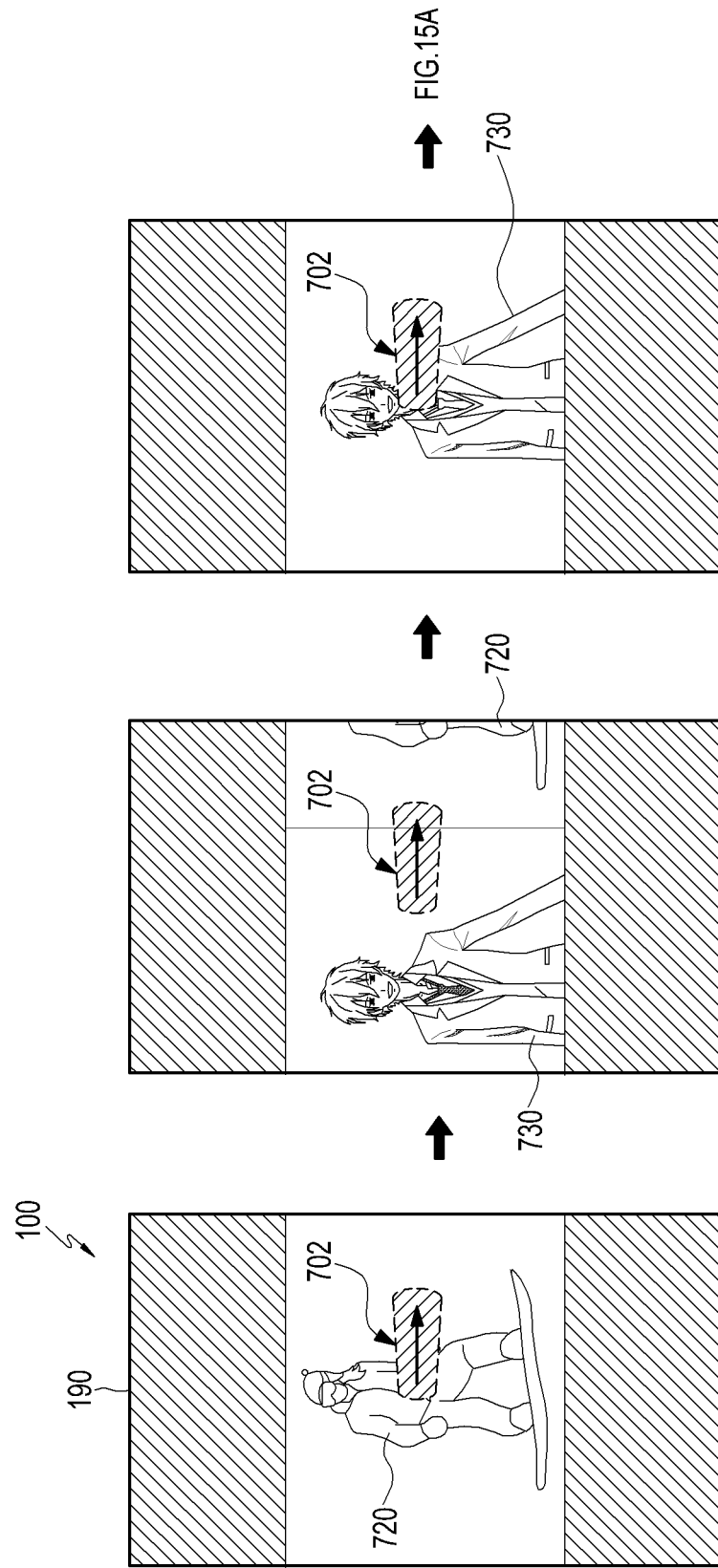

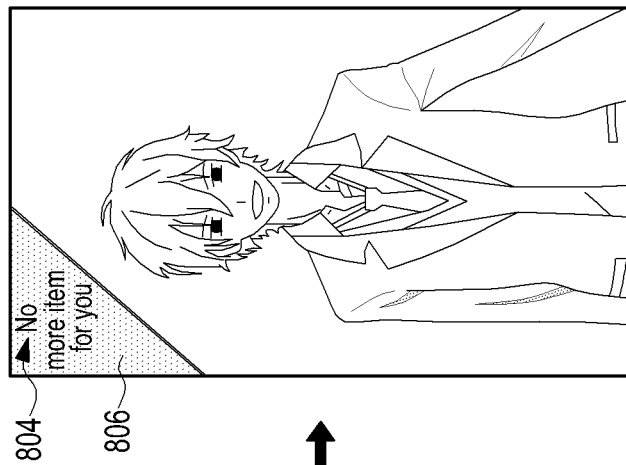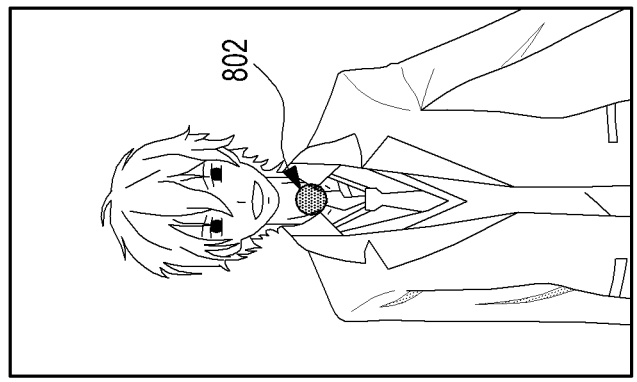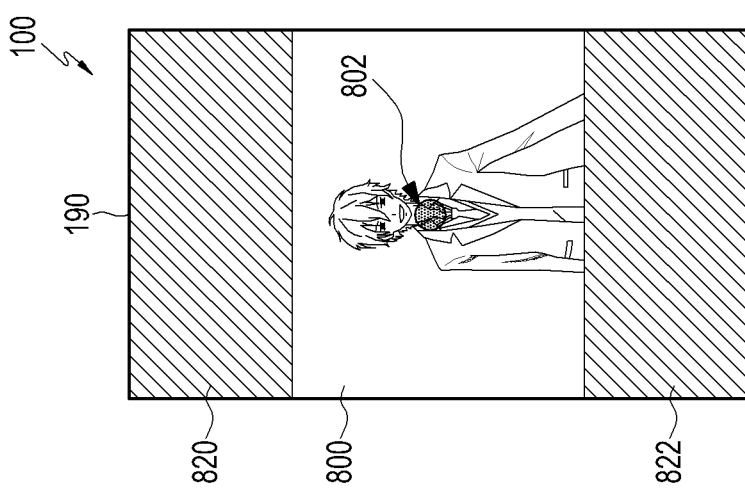

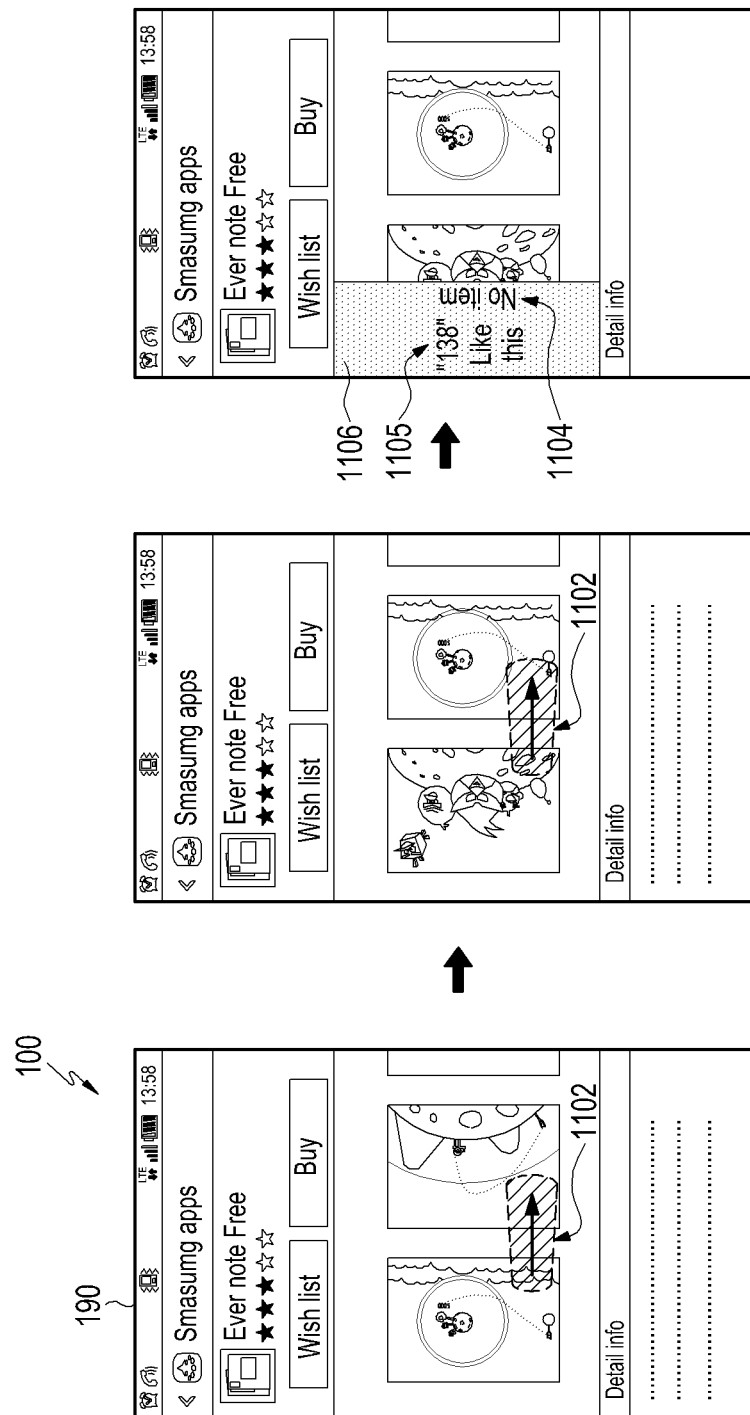

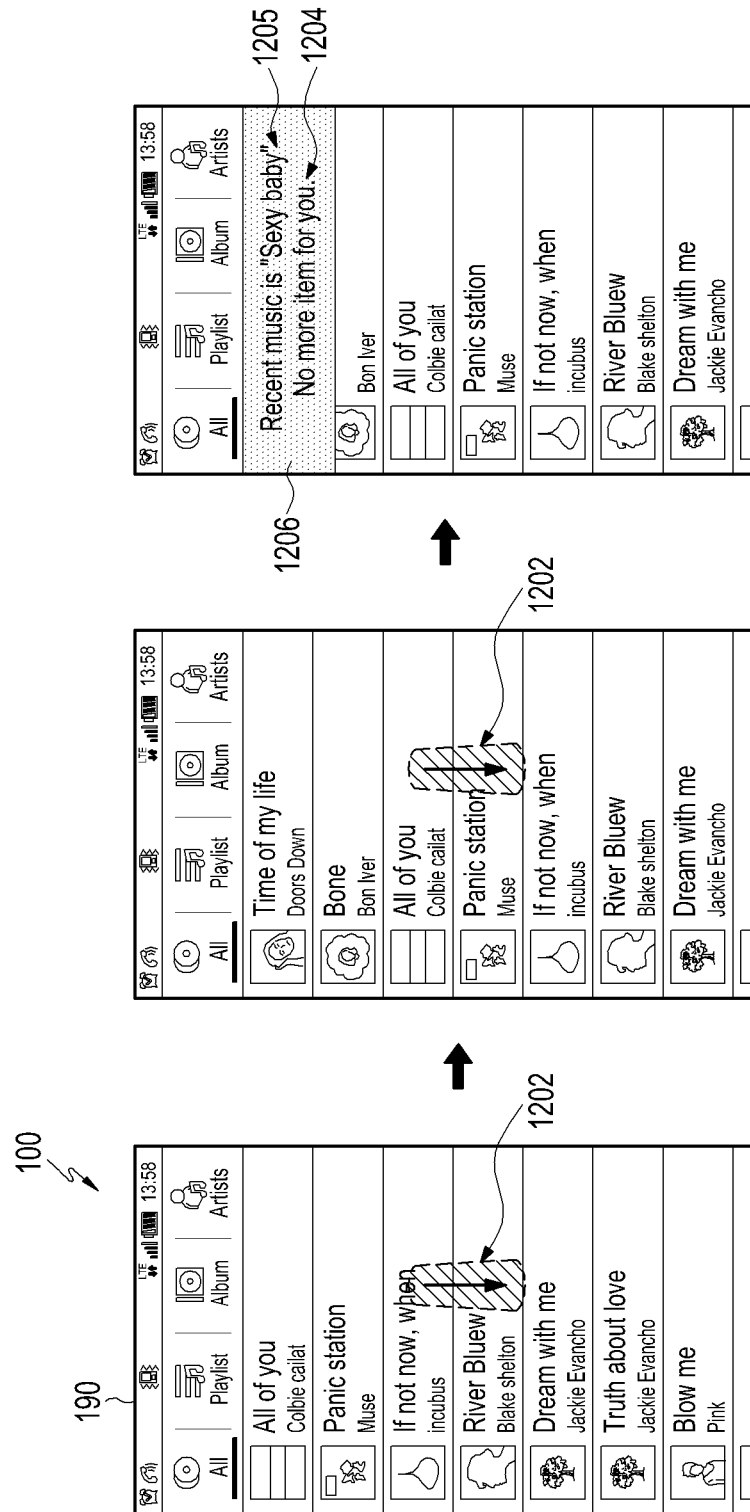

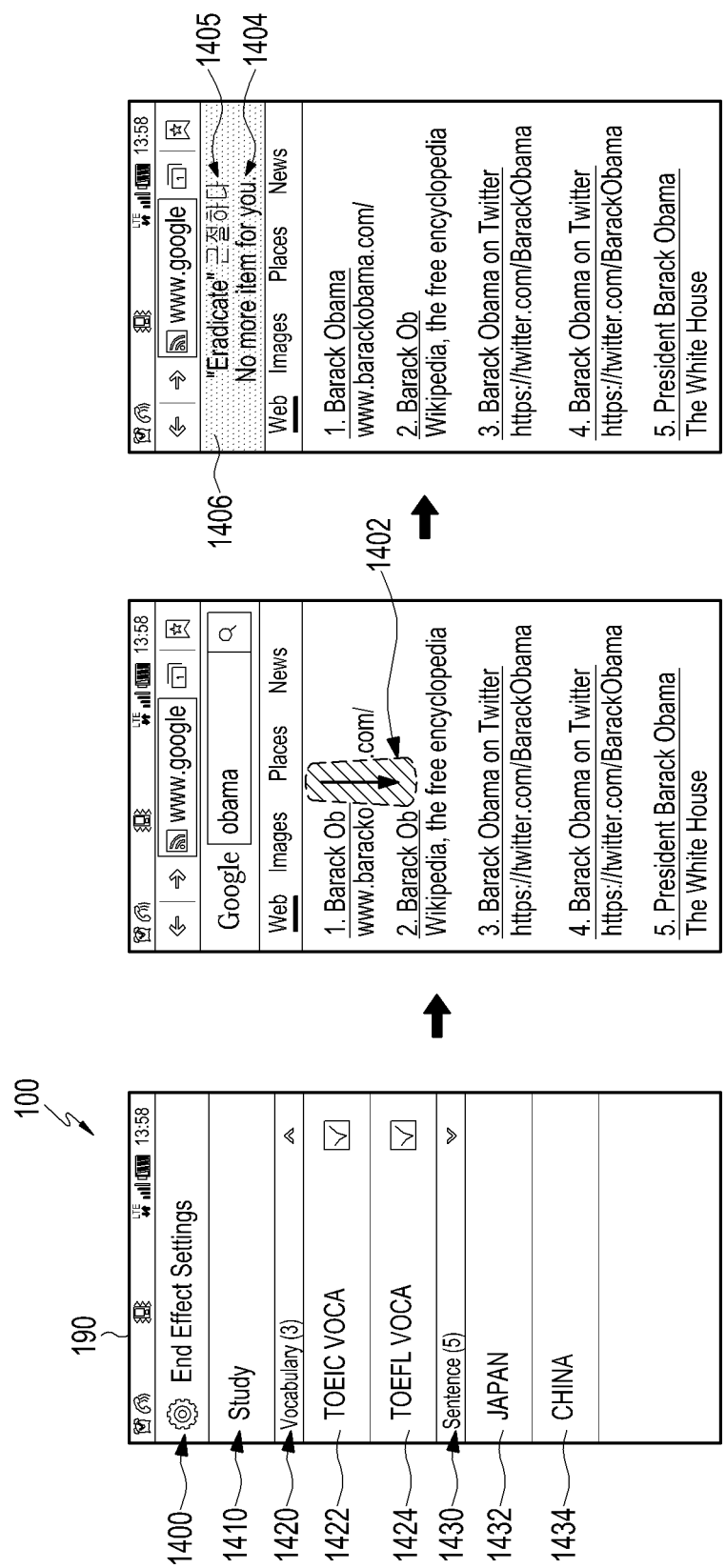

MOBILE APPARATUS DISPLAYING END EFFECT AND CONTROL METHOD THEREOF

PRIORITY

This application is a continuation application of prior application Ser. No. 16/020,468 filed on Jun. 27, 2018, which issued as U.S. Pat. No. 10,310,665 on Jun. 4, 2019; which is a continuation application of prior application Ser. No. 15/608,085 filed on May 30, 2017, which issued as U.S. Pat. No. 10,048,800 on Aug. 14, 2018; which is a continuation of prior application Ser. No. 14/092,218 filed on Nov. 27, 2013, which issued as U.S. Pat. No. 9,671,891 on Jun. 6, 2017; which claims the benefit under 35 U.S.C. § 119(a) of a Korean patent application filed on Nov. 30, 2012 in the Korean Intellectual Property Office and assigned Serial No. 10-2012-0138444, the entire disclosure of each of which is hereby incorporated by reference.

BACKGROUND OF THE INVENTION

1. Field of the Invention

The present invention relates to a technology concerning a mobile apparatus and a method for controlling the same. More particularly, the present invention relates to a technology for providing an effect when conversion for an object is ended.

2. Description of the Related Art

Technologies related to a mobile apparatus are rapidly developing. In particular, as a touch screen is increasingly included in mobile apparatuses, technologies related to a user interface through the touch screen are rapidly developing.

A user interface using a touch screen refers to a method of detecting a user's touches to receive various inputs so as to perform various functions.

At this time, various applications may be executed in a mobile apparatus, and various objects may be displayed on the touch screen through the execution of the applications. In addition, the mobile apparatus may convert the objects by detecting the user's touches. For example, a web browser application may be executed in the mobile apparatus, and a web page may be displayed on the touch screen of the mobile apparatus. Further, the mobile apparatus may detect the user's touch to scroll and move a web page.

However, there is a case in which a web page to be scrolled does not exist anymore when the mobile apparatus scrolls and moves the web page. Unless a separate effect is provided when the web page to be scrolled does not exist anymore, the user may not notice that it is not possible to scroll the web page any more.

Accordingly, what is required is a technology of providing a separate effect when conversion for various objects displayed on the touch screen of a mobile apparatus is ended, for example, when scroll for a web page is ended.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a mobile apparatus which converts at least one object in response to a detected gesture, detects that the conversion for the at least one object is ended, and displays an end effect on a touch screen, and a method of controlling the same.

Another aspect of the present invention is to provide a mobile apparatus which after an end effect has been removed, displays the end effect again in response to a gesture detected again, and a method of controlling the same.

In accordance with an aspect of the present invention, a method of controlling a mobile apparatus to display an end effect is provided. The method includes displaying at least one object on a first layer on a touch screen, converting the at least one object in response to a first gesture that converts the at least one object, detecting that the conversion for the at least one object is ended, and displaying an end effect, which represents a message saying that the at least one object to be converted does not exist anymore or represents additional information, on the touch screen.

In accordance with another aspect of the present invention, a mobile apparatus that displays an end effect is provided. The mobile apparatus includes a touch screen configured to display at least one object on a first layer, and a controller configured to convert the at least one object in response to a first gesture that converts the at least one object, to detect that the conversion for the at least one object is ended, and to display an end effect, which represents a message saying that the at least one object to be converted does not exist anymore or represents additional information, on the touch screen.

According to an exemplary embodiment of the present invention, there is an advantage in that a message saying that at least one object to be converted does not exist anymore is displayed so that a user may be intuitively notified that the conversion for the at least one object has been ended.

According to another exemplary embodiment, there is an advantage in that an end effect may be displayed on the second layer. In addition, there is an advantage in that the end effect may be displayed on the second layer which is formed as a translucent window or an opaque window.

According to another exemplary embodiment of the present invention, there is an advantage in that an end effect is displayed in a region where the at least one object to be converted does not exist anymore so that the user may be informed of the region where the at least one object to be converted does not exist anymore.

According to another exemplary embodiment of the present invention, there is an advantage in that an end effect including additional information is displayed so that the user may be intuitively notified that the conversion for the at least one object has been ended, and concurrently be informed of the additional information.

According to another exemplary embodiment, there is an advantage in that an end effect including additional information is displayed so that the user may be provided with information associated with a currently executed application, information associated with the current status of the mobile apparatus, or contents for memorization.

According to another exemplary embodiment of the present invention, there is an advantage in that an end effect is displayed in response to a case where a detected length of a gesture is longer than a preset length so that the user may be additionally notified that the conversion for the at least one object has been ended.

According to another exemplary embodiment, there is also an advantage in that an end effect having a conversion effect is displayed so that the user may be additionally notified that the conversion for the at least one object has been ended.

According to another exemplary embodiment, an end effect is displayed again in response to a gesture detected again after the end effect has been removed so that the user may be additionally notified that the conversion for the at least one object has been ended.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A to 5D illustrate scenes that display an end effect according to an exemplary embodiment of the present invention;

FIGS. 7A to 8B illustrate scenes that display an end effect according to an exemplary embodiment of the present invention;

FIGS. 10A to 11C illustrate scenes that display an end effect according to an exemplary embodiment of the present invention;

FIGS. 12A to 13B illustrate scenes that display an end effect according to a first example of an exemplary embodiment of the present invention;

FIGS. 14A to 15C illustrate scenes that display an end effect according to a second example of an exemplary embodiment of the present invention;

FIGS. 16A to 17B illustrate scenes that display an end effect according to a third example of an exemplary embodiment of the present invention;

FIGS. 20A to 20C illustrate scenes that display an end effect according to a sixth example of an exemplary embodiment of the present invention;

FIGS. 21A to 21C illustrate scenes that display an end effect according to a seventh example of an exemplary embodiment of the present invention;

FIGS. 23A to 23C illustrate scenes that display an end effect according to a ninth example of an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
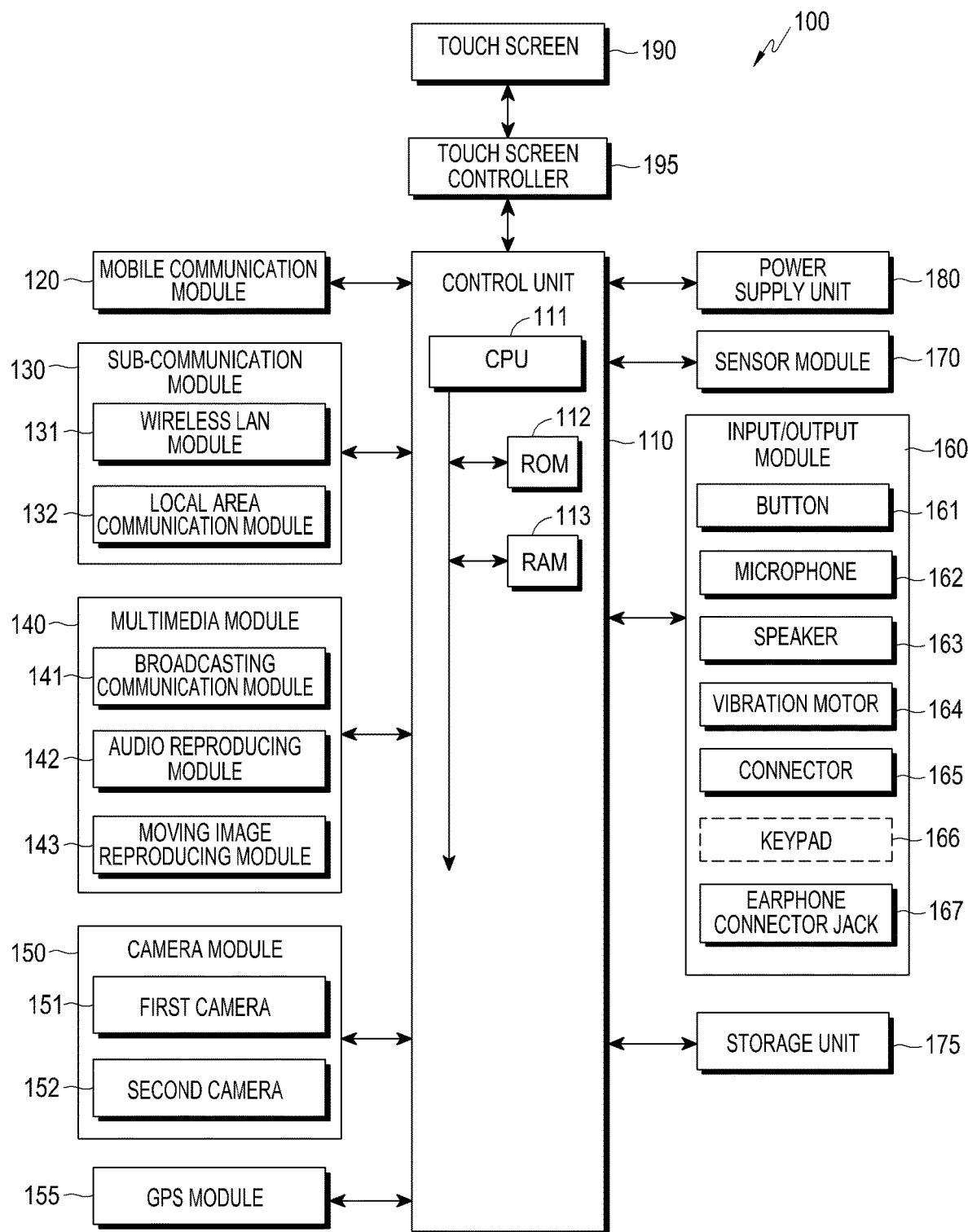
FIG. 1 is a schematic block diagram illustrating a mobile apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terminologies including ordinals such as first and second may be used in describing various configurational elements, the configurational elements are not limited by the terminologies. The terminologies are merely used for the purpose of differentiating one configurational element from any other configurational element. For example, a first configurational element may be referred to as a second configurational element and vice versa without departing from the scope of the present invention. The terminology "and/or" is used to include to a combination of a plurality of related described items or any one item among the plurality of related described items.

The terminologies used herein are not intended to limit the present invention but to describe specific exemplary embodiments. A singular expression may include a plural expression unless they are clearly different from each other in context. It shall be noted that in the present application, the terms such as "include" and "have" are intended to indicate that a feature, a figure, a step, an operation, a configurational element, a part, or a combination thereof may exist but are not intended to exclude in advance the possibility of existence or addition of one or more other features, figures, steps, operations, configurational elements, parts, or combinations thereof.

Unless defined otherwise, all the terminologies used herein including technical or scientific terminologies have the same meaning as those understood by a person having an ordinary skill in the art to which the present invention belongs. Terminologies as defined in a generally used dictionary should be interpreted to have the same meaning as those of the terminologies in context in the related descriptions, and shall not be interpreted in an ideal or excessively formal meaning unless they are explicitly defined herein.

FIG. 1 is a schematic block diagram illustrating a mobile apparatus according to an exemplary embodiment of the present invention.

Referring to FIG. 1, the mobile apparatus 100 may be connected with an external apparatus (not illustrated) using an external apparatus connecting unit such as a sub-communication module 130, a connector 165 and an earphone connecting jack 167. The "external apparatus" may include various apparatuses such as an earphone, an external speaker, a Universal Serial Bus (USB) memory, a charger, a cradle, a docking station, a Digital Multimedia Broadcasting (DMB) antenna device, a mobile payment related apparatus, a health care apparatus (e.g., a blood sugar tester), a game machine, and a vehicle navigation system that may be detached from and wiredly connected to the mobile apparatus 100. In addition, the "external apparatus" may include a local area communication apparatus such as a Bluetooth communication apparatus and a Near Field Communication (NFC) apparatus, a WiFi-direct communication apparatus, and a wireless Access Point (AP) that may be wirelessly connected to the mobile apparatus 100 through local area communication. Further, the external apparatus may include other apparatuses such as a portable phone, a smart phone, a tablet Personal Computer (PC), a desktop PC, and a server.

Referring to FIG. 1, the mobile apparatus 100 includes a display unit 190 and a display controller 195. In addition, the mobile apparatus 100 includes a control unit 110, a mobile communication module 120, the sub-communication module 130, a multimedia module 140, a camera module 150, a Global Positioning System (GPS) module 155, an input/output module 160, a sensor module 170, a storage unit 175, and a power supply unit 180. The sub-communication module 130 includes at least one of a wireless Local Area Network (LAN) module 131 and a local area communication module 132, and the multimedia module 140 includes at least one of a broadcasting communication module 141, an audio reproducing module 142, and a moving image reproducing module 143. The camera module 150 includes at least one of a first camera 151 and a second camera 152, and the input/output module 160 includes at least one of a button 161, a microphone 162, a speaker 163, a vibration motor 164, the connector 165, a keypad 166, and the earphone connecting jack 167. Herein below, descriptions will be made as to a case where the display unit 190 and the display controller 195 are a touch screen and a touch screen controller, respectively, by way of an example.

The control unit 110 may include a Central Processing Unit (CPU) 111, a Read Only Memory (ROM 112) in which control programs for controlling the mobile apparatus 100 are stored, and a Random Access Memory (RAM) 113 which stores signals or data input from the outside of the mobile apparatus 100 or is used as a memory region for an operation performed in the mobile apparatus 100. The CPU 111 may include a single core, a dual core, a triple core, or a quad core. The CPU 111, the 112 and the RAM 113 may be connected with each other through internal buses.

The control unit 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 allows the mobile apparatus 100 to be connected with an external apparatus through mobile communication using one or more antennas (not illustrated) of each apparatus according to the control of the control unit 110. The mobile communication module 120 may transmit/receive a wireless signal for voice communication, image communication, text message (i.e., Short Message Service (SMS) message), or multimedia message (i.e., Multimedia Messaging Service (MIMS) message) to/from a portable phone (not illustrated) of which the phone number is input to the mobile apparatus 100, a smart phone (not illustrated), a tablet PC, or other apparatuses (not illustrated).

The sub-communication module 130 may include at least one of the wireless LAN module 131 and the local area communication module 132. For example, the sub-communication module 130 may include only the wireless LAN module 131, only the local area communication module 132, or both the wireless LAN module 131 and the local area communication module 132.

The wireless LAN module 131 may be connected to the Internet according to the control of the control unit 110 in a place where a wireless AP (not illustrated) is installed. The wireless LAN module 131 may support the wireless LAN standard, IEEE802.11x, of the Institute of Electrical and Electronic Engineers (IEEE). The local area communication module 132 may perform local area communication wirelessly between the mobile apparatus 100 and an image forming apparatus (not illustrated) according to the control of the control unit 110. The local area communication method may include, for example, Bluetooth, Infrared Data Association (IrDA) communication, WiFi-direct communication, and NFC.

According to the performance of the mobile apparatus 100, the mobile apparatus 100 may include at least one of the mobile communication module 120, the wireless LAN module 131, and the local area communication module 132. For example, according to the performance, the mobile apparatus 100 may include a combination of the mobile communication module 120, the wireless LAN module 131, and the local area communication module 132.

The multimedia module 140 may include the broadcasting communication module 141, the audio reproducing module 142, or the moving image reproducing module 143. The broadcasting communication module 141 may receive a broadcasting signal (e.g., a TeleVision (TV) broadcasting signal, a radio broadcasting signal or a data broadcasting signal) which is transmitted from a broadcasting station or broadcasting added information (e.g., Electric Program Guide (EPG) or Electric Service Guide (ESG)) through a broadcasting communication antenna (not illustrated) according to the control of the control unit 110. The audio reproducing module 142 may reproduce a stored or received digital audio file (e.g., a file of which the file extension is mp3, wma, ogg, or way) according to the control of the control unit 110. The moving image reproducing module 143 may reproduce a stored or received digital moving image file according to the control of the control unit 110. The moving image reproducing module 143 may reproduce a digital audio file.

The multimedia module 140 may include an audio reproducing module 142 and a moving image reproducing module 143 in addition to the broadcasting communication module 141. Also, the audio reproducing module 142 or the moving image reproducing module 143 of the multimedia module 140 may be included in the control unit 110.

The camera module 150 may include at least one of the first camera 151 and the second camera 152 each of which photographs a still image or a moving image according to the control of the control unit 110. In addition, the first camera 151 or the second camera 152 may include an auxiliary light source (e.g., a flash (not illustrated)) that provides an amount of light required for photographing. The first camera 151 may be disposed on the front surface of the mobile apparatus 100 and the second camera 152 may be disposed on the rear surface of the mobile apparatus 100. Alternatively, the first camera 151 and the second camera 152 may be positioned adjacent to each other (e.g., at a distance of 1 cm to 8 cm between the first camera 151 and the second camera 152) to be capable of photographing a three dimensional still image or a three dimensional moving image.

The GPS module 155 may receive radio waves from a plurality of Earth-orbiting GPS satellites (not illustrated), and may calculate the distance of the apparatus using the time of arrival of the radio waves to the mobile apparatus 100 from the GPS satellites.

The input/output module 160 may include one of a at least one button 161, the microphone 162, the speaker 163, the vibration motor 164, the connector 165, and the keypad 166.

The at least one button 161 may be formed on the front surface, side surfaces or rear surface of the housing of the mobile apparatus 100 and may include at least one of a power/lock button, a volume button, a menu button, a home button, a back button, and a search button.

The microphone 162 receives an input of voice or sound to produce an electrical signal according to the control of the control unit 110.

The speaker 163 may output sounds which respectively correspond to various signals of the mobile communication module 120, the sub-communication module 130, the multimedia module 140, and the camera module 150 (e.g., a radio signal, a broadcasting signal, a digital audio file, a digital moving image file, photographing or the like) to the outside of the mobile apparatus 100 according to the control of the control unit 110. The speaker 163 may output a sound which corresponds to the functions performed by the mobile apparatus 100 (for example, a button operation sound corresponding to a phone call or a call connection sound). One or a plurality of speakers 163 may be formed at a proper position or positions of the housing of the mobile apparatus 100.

The vibration motor 164 may convert an electronic signal to a mechanical signal according to the control of the control unit 110. For example, when the mobile apparatus 100 set to a vibration mode receives a voice call from any other apparatus (not illustrated), the vibration motor 164 is operated. One or a plurality of vibration motors 164 may be provided in the housing of the mobile apparatus 100. The vibration motor 164 may be operated in response to a user's touch action that touches the touch screen 190 and a continuous movement of the touch on the touch screen 190.

The connector 165 may be used as an interface which interconnects the mobile apparatus 100 and an external apparatus (not illustrated) or a power source (not illustrated). The mobile apparatus 100 may transmit data stored in the storage unit 175 of the mobile apparatus 100 to the external apparatus (not illustrated) or receive data from an external apparatus (not illustrated) through a wired cable connected to the connector 165 according to the control of the control unit 110. At this time, the external apparatus may be a docking station, and the data may be an input signal transferred from an external input device, for example, a mouse and a keyboard. In addition, the mobile apparatus 100 may receive power from the power source (not illustrated) through the wired cable connected to the connector 165 or charge a battery (not illustrated) using the power source.

The keypad 166 may receive a key input from the user so as to control the mobile apparatus 100. The keypad 166 may include a physical keypad (not illustrated) formed on the mobile apparatus 100 or a virtual keypad (not illustrated) displayed on the touch screen 190. The physical keypad (not illustrated) formed on the mobile apparatus 100 may be omitted according to the performance or configuration of the mobile apparatus 100.

An earphone (not illustrated) may be inserted into the earphone connecting jack 167 to be connected to the mobile apparatus 100.

The sensor module 170 includes at least one sensor that detects the status of the mobile apparatus 100. For example, the sensor module 170 may include a proximity sensor that detects whether the user approaches to the mobile apparatus 100 or not and an illumination sensor that detects the amount of light around the mobile apparatus 100. Also, the sensor module 170 may include a gyro sensor. The gyro sensor may detect the operation of the mobile apparatus 100 (e.g., rotation of the mobile apparatus 100, or acceleration or vibration applied to the mobile apparatus 100), may detect a point of the compass using the magnetic field on Earth, or may detect a gravity acting direction. Further, the sensor module 170 may include an altimeter that measures the atmospheric pressure to detect an attitude, and the sensor module 170 may produce a signal corresponding to the detection and transmit the signal to the control unit 110. The sensors of the sensor module 170 may be added or omitted according to the performance of the mobile apparatus 100.

The storage unit 175 may store signals or data input/output in response to the operations of the mobile communication module 120, the sub-communication module 130, the multimedia module 140, the camera module 150, the GPS module 155, the input/output module 160, the sensor module 170, and the touch screen 190 according to the control of the control unit 110. The storage unit 175 may store control programs and applications for controlling the mobile apparatus 100 or the control unit 110.

The term, "storage unit" may include the storage unit 175, the ROM 112 and the RAM 113 in the control unit 110, or a memory card (not illustrated) (e.g., a Secure Digital (SD) card or a memory stick) mounted in the mobile apparatus 100. The storage unit may include a non-volatile memory, a volatile memory, a Hard Disc Drive (HDD) or a Solid State Drive (SSD).

The power supply unit 180 may supply power to one or more batteries (not illustrated) provided in the housing of the mobile apparatus 100 according to the control of the control unit 110. The one or more batteries (not illustrated) supply power to the mobile apparatus 100. In addition, the power supply unit 180 may supply power input from an external power source (not illustrated) through a wired cable connected to the connector 165 to the mobile apparatus 100. Further, the power supply unit 180 may supply power input wirelessly from the external power source through a wireless charging technology to the mobile apparatus 100.

The touch screen 190 may provide a plurality of user interfaces that correspond to various services (e.g., phone call, data transmission, broadcasting and photographing), respectively, to the user. The touch screen 190 may transmit an analogue signal corresponding to at least one touch input to the user interfaces to the touch screen controller 195. The touch screen 190 may receive an input through the user's body (e.g., fingers including a thumb) or a touchable input means (e.g., a stylus pen). In addition, the touch screen 190 may receive an input of a continuous movement of a touch among one or more touches. The touch screen 190 may transmit an analogue signal corresponding to the continuous movement of a touch input thereto to the touch screen controller 195.

In the present disclosure, the touch is not limited to a contact between the touch screen 190 and the user's body or a touchable input means and includes a contactless touch. The space capable of being detected by the touch screen 190 may be changed according to the performance or configuration of the mobile apparatus 100.

The touch screen 190 may be implemented, for example, in a resistive type, a capacitive type, an infrared type, or an acoustic wave type.

The touch screen controller 195 converts an analogue signal received from the touch screen 190 into a digital signal (e.g., an X and Y coordinate) and transmits the digital signal to the control unit 110. The control unit 110 may control the touch screen 190 using the digital signal received from the touch screen controller 195. For example, the control unit 110 may cause a shortcut icon (not illustrated) displayed on the touch screen 190 to be selected or may execute the shortcut icon (not illustrated) in response to a touch. In addition, the touch screen controller 195 may be included in the control unit 110.

Figure 2:
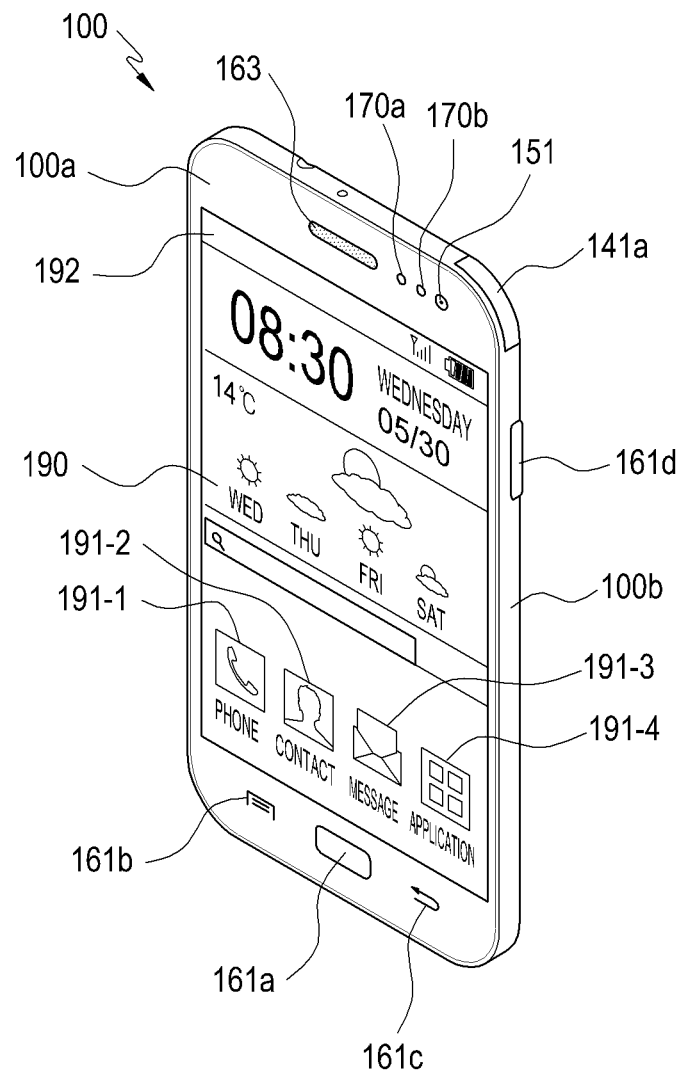
FIG. 2 is a front side perspective view of a mobile apparatus according to an exemplary embodiment of the present invention.
Figure 3:
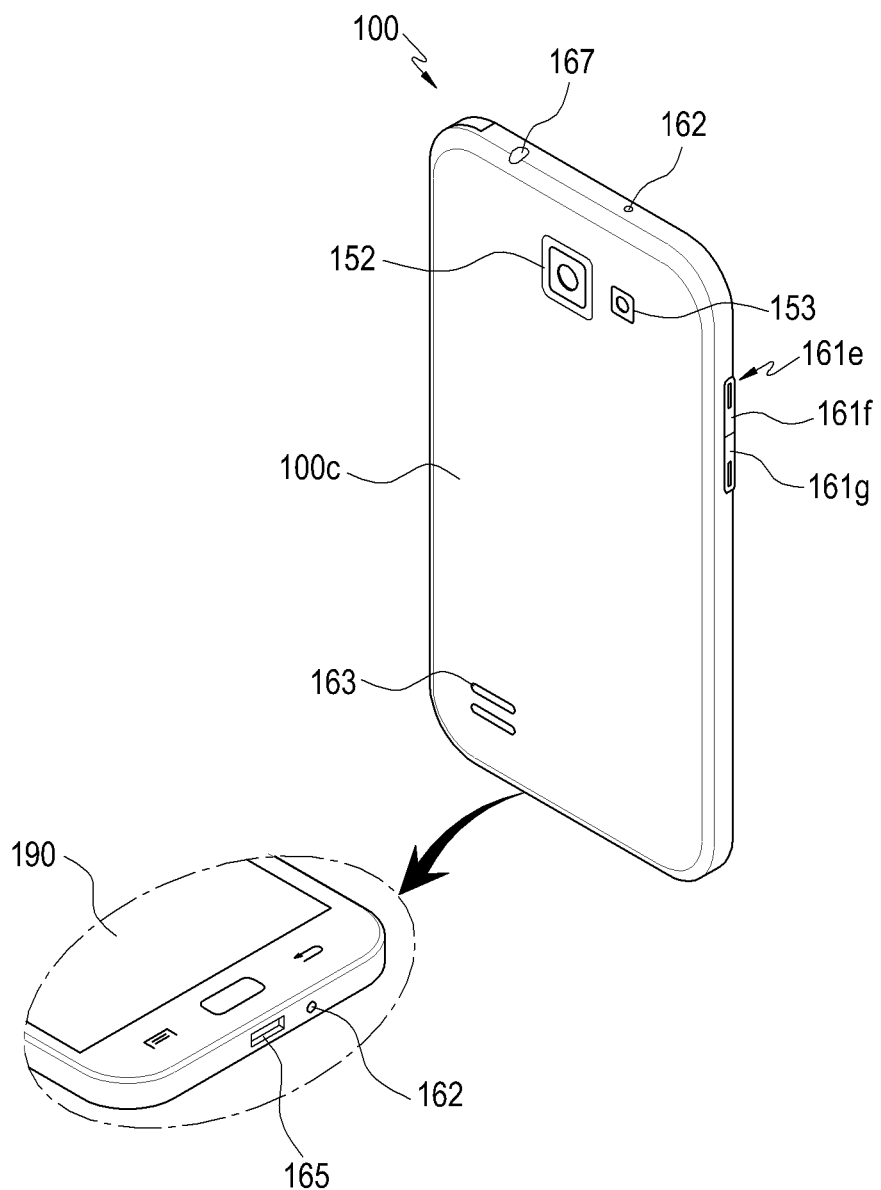
FIG. 3 is a rear side perspective view of a mobile apparatus according to an exemplary embodiment of the present invention.

FIG. 2 is a front side perspective view of a mobile apparatus according to an exemplary embodiment of the present invention. FIG. 3 is a rear side perspective view of a mobile apparatus according to an exemplary embodiment of the present invention.

Referring to FIG. 2, a touch screen 190 is arranged at the center of the front surface 100a of the mobile apparatus 100. The touch screen 190 is formed in a large size so that the touch screen 190 occupies almost all the front surface 100a of the mobile apparatus 100. In FIG. 2, an example in which a main home screen is displayed on the touch screen 190 is illustrated. The main home screen is the first screen displayed on the touch screen 190 when the mobile apparatus 100 is turned ON. When the mobile apparatus 100 includes a plurality of pages of different home screens, the main home screen may be the first home screen among the plurality of pages of home screens. Shortcut icons 191-1, 191-2, and 191-3 that execute frequently used applications, an application switch key 191-4, time, weather, etc. may be displayed on the home screen. The application switch key 191-4 displays application icons that indicate applications on the touch screen 190. At the top end of the touch screen 190, a status bar 192 may be formed that indicates the status of the mobile apparatus 100 such as the battery charge status, the intensity of a received signal and current time.

A home button 161a, a menu button 161b, and a back button 161c may be formed at the lower part of the touch screen 190.

The home button 161a displays the main home screen on the touch screen 190. For example, when the home button 161a is pressed (or touched) in a state where any home screen different from the main home screen or a menu screen is displayed on the touch screen 190, the main home screen may be displayed on the touch screen 190. In addition, when the home button 161a is pressed (or touched) while an application is being executed on the touch screen 190, the main home screen illustrated in FIG. 2 may be displayed on the touch screen 190. In addition, the button 161a may be used to cause the recently used applications on the touch screen 190 to be displayed or to display a task manager.

The menu button 161b provides connection menus that may be used on the touch screen 190. The connection menus may include a widget addition menu, a background screen menu, a search menu, an editing menu, an environment setting menu, etc. In addition, when an application is executed, the menu button 161b may provide a connection menu connected to the application.

The back button 161c may cause a screen executed just prior to the currently executed screen to be displayed or may end the most recently used application.

At an edge of the front surface 100a of the mobile apparatus 100, a first camera 151, an illumination sensor 170a, and a proximity sensor 170b may be arranged. On the rear surface 100c of the mobile apparatus 100, a second camera 152, a flash 153, and a speaker 163 may be arranged.

On the side surfaces 100b of the mobile apparatus 100, for example, a power/reset button 161d, a volume button 161e, a terrestrial DMB antenna 141a that receives broadcasting, and one or more microphones 162 may be arranged. The DMB antenna 141a may be formed to be fixed or detachably mounted on the mobile apparatus 100. The volume button 161e may include a volume up button 161f and a volume down button 161g.

A connector 165 is formed on the bottom side surface of the mobile apparatus 100. The connector 165 is formed with a plurality of electrodes to be wiredly connected to an external apparatus. On the top side surface of the mobile apparatus 100, an earphone connecting jack 167 may be formed. An earphone may be inserted into the earphone connecting jack 167.

Figure 4:
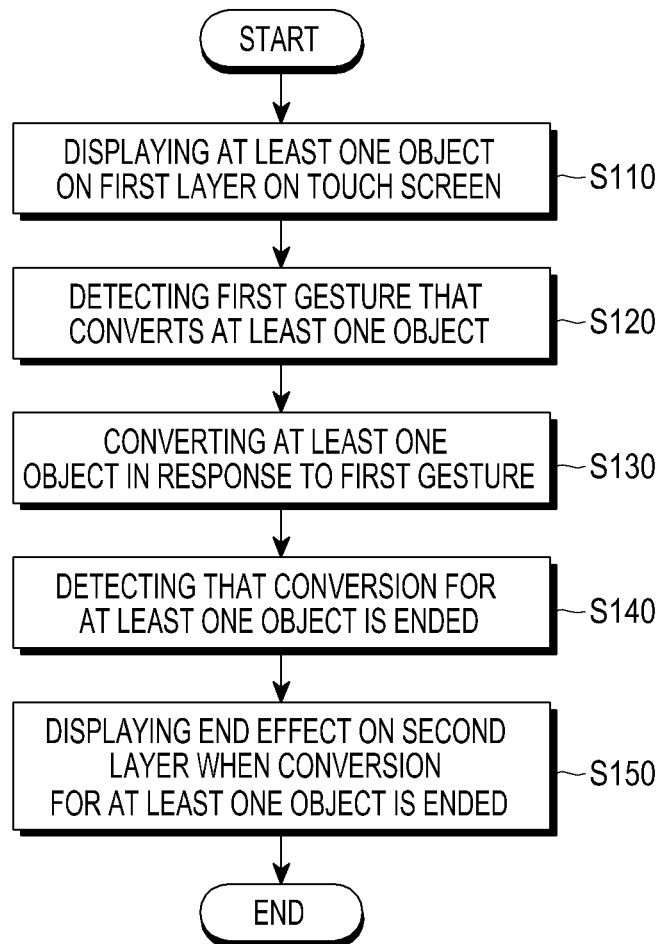
FIG. 4 is a flowchart illustrating a method of controlling a mobile apparatus to display an end effect according to an exemplary embodiment of the present invention.

FIG. 4 is a flowchart related to a method of controlling a mobile apparatus to display an end effect according to an exemplary embodiment of the present invention. FIGS. 5A to 5D illustrate scenes that display an end effect according to the exemplary embodiment of the present invention.

Referring to FIG. 4, a mobile apparatus control method for displaying an end effect according to an exemplary embodiment of the present invention displays at least one object on a first layer on the touch screen in step S110. That is, the control unit 110 of the mobile apparatus 100 displays at least one object on the first layer on the touch screen. Also, the at least one object may be formed as a web page, contact information, an image, a text, a video, an audio, an icon, an item, a tab, or a combination thereof. At this time, the first layer may be included in at least one layer and a screen of the mobile apparatus may be displayed through the at least one layer. Also, the second layer may be included in the at least one layer. Accordingly, the control unit 110 may show at least one object to the user displayed on the first layer on the touch screen. Referring to FIG. 5A, the control unit 110 of the mobile apparatus 100 displays at least one object formed as a web page 200 on the first layer on the touch screen 190. The control unit 110 executes a web browser application, and the web page 200 may be displayed on the first layer on the touch screen 190 through the execution of the web browser application. Accordingly, the control unit 110 may show the web page 200 displayed on the first layer on the touch screen 190. At this time, a search site web page is displayed on FIG. 5A. In addition, search results concerning Barack Obama are searched and displayed on the web page.

Next, a first gesture that converts the at least one object is detected in step S120. However, the first gesture may be referred to and described as a gesture. The conversion may be any one of a scroll, a magnification and a reduction. For example, the conversion may be the scroll. At this time, the scroll refers to an operation that moves the at least one object to be displayed on the touch screen. Also, the gesture may be a touch input that converts the at least one object. In addition, the touch input may be at least one of a touch, a drag or a flick that converts the at least one object. For example, referring to FIG. 5B, the control unit 110 may detect a gesture that scrolls a web page which is the at least one object. That is, the control unit 110 may detect a touch input such as a drag or a flick that scrolls the web page. That is, as in FIG. 5B, the control unit 110 may detect a touch input 202 such as a drag or a flick that scrolls the at least one object which is the web page to the lower end of the touch screen 190.

Next, the at least one object is converted in response to the gesture in step S130. That is, the control unit 110 may convert the at least one object in response to the gesture detected in step S120. In addition, the conversion of the at least one object corresponding to the gesture may be preset, and the conversion preset to correspond to the gesture may be stored in the storage unit in advance. At this time, as described in step S110 and step S120, the at least one object may be formed as a web page, contact information, an image, a text, a video, an audio, an icon, an item, a tab or a combination thereof, and the conversion may be one of a scroll, a magnification and a reduction. Also, the gesture may be a touch input that converts the at least one object. For example, the conversion preset to correspond to a touch input such as a drag or a flick may be the scroll. Accordingly, the control unit 110 may scroll at least one object such as a web page in response to a touch input such as a drag or a flick. At this time, the control unit 110 may scroll the at least one object such as a web page in the same direction as the drag or flick direction. That is, as illustrated in FIG. 5C, the control unit 110 may scroll the web page to the lower end of the touch screen 190 in response to the touch input 202 such as a downward drag or flick. At this time, when the web page is scrolled to the lower end, the top end of the web page, which has not been displayed on the touch screen, may be naturally displayed on the touch screen. Accordingly, although in FIG. 5A before the web page is scrolled, the second to sixth items of the search results concerning Barack Obama are displayed on the touch screen, in FIG. 5C after the web page is scrolled to the lower end of the touch screen 190 by the control unit 110, the first to fifth items of the search results concerning Barack Obama and a search window of the search site are displayed on the touch screen. Accordingly, as the control unit 110 scrolls the web page to the lower end of the touch screen 190 in response to the touch input 202 such as a downward drag or flick, the top end of the web page which has not been displayed on the touch screen may be displayed on the touch screen.

Next, it is detected that the conversion for the at least one object is ended in step S140. The control unit 110 may detect that the conversion for the at least one object executed in step S130 is ended. That is, while the conversion for the at least one object is being performed in step S130, the control unit 110 may detect that the conversion for the at least one object is ended. At this time, when the at least one object to be converted does not exist anymore while the conversion for the at least one object is being performed, the control unit 110 may detect that the conversion for the at least one object is ended. For example, while the scroll for the at least one object is being performed, the control unit 110 may detect that the scroll for the at least one object is ended. Referring to FIG. 5C again, while the scroll for the at least one object which is a web page is being performed, the control unit 110 may detect that the scroll for the web page is ended. In step S130, while the control unit 110 is scrolling the web page to the lower end of the touch screen in response to the downward drag or flick, the control unit 110 may detect that the scroll for the web page is ended. That is, the control unit 110 may cause the top end of the web page, which has not been displayed, to be displayed on the screen in response to the downward drag or flick detected in step S130. In addition, the top end of the web page may not exist anymore while the control unit 110 is causing the top end of the web page, which has not been displayed, to be displayed on the touch screen. At this time, when the top end of the web page to be displayed does not exist anymore, the control unit 110 may detect that the scroll for the web page is ended. Accordingly, while the conversion for the at least one object is being performed, the control unit 110 may detect that the conversion for the at least one object is ended.

Next, when the conversion for the at least one object is ended, an end effect is displayed on the second layer on the touch screen in step S150. When the control unit 110 detects that the conversion for the at least one object is ended in step S140, the control unit 110 displays the end effect on the second layer on the touch screen 190. At this time, the second layer is included in the at least one layer described in step S110, and the screen of the mobile apparatus may be displayed through the at least one layer. Accordingly, the control unit 110 may show the end effect displayed on the second layer on the touch screen to the user. In addition, the second layer may be displayed on the touch screen while hiding the first layer. Accordingly, the second layer where the end effect is displayed may be displayed on the touch screen while hiding the first layer where the at least one object is displayed. In addition, the second layer may be a translucent window or an opaque window. That is, the control unit 110 may form the second layer as a translucent window. The translucent window refers to a window formed with a substantially half transparency to show an object displayed on the translucent window and an object displayed on a separate window formed below the translucent window concurrently. Accordingly, the control unit 110 may show the end effect displayed on the second layer on the touch screen to the user translucently, and at the same time, the control unit 110 may show the at least one object displayed on the first layer to the user. In addition, the control unit 110 may form the second layer as an opaque window. The opaque window refers to a window formed to show only an object displayed on the opaque window and not to show an object displayed on a separate window formed below the opaque window. Accordingly, the control unit 110 may show the end effect displayed on the second layer on the touch screen to the user opaquely. That is, when the end effect displayed on the second layer is shown opaquely, the at least one object displayed on the first layer positioned below the second layer is hidden by the end effect not to be shown.

At this time, the end effect may be to display a message saying that the at least one object to be converted does not exist anymore. Also, the end effect may be displayed in a region where the at least one object to be converted does not exist anymore. In addition, the end effect may be displayed in a box type in the region where the at least one object to be converted does not exist anymore.

For example, the at least one object is a web page and the conversion may be the scroll. Accordingly, in step S140, the control unit 110 may detect that the scroll of the web page is ended. In addition, when it is detected that the scroll of the web page is ended, the control unit 110 may display the end effect on the second layer on the touch screen in step S150. For example, as in FIG. 5C, when it is detected that the scroll for the web page is ended, the control unit 110 may display the end effect on the second layer on the touch screen as in FIG. 5D. At this time, the second layer, on which the end effect is displayed, may be displayed on the touch screen while hiding the first layer on which the web page is displayed. In addition, the end effect may be to display a message saying that the at least one object to be converted does not exist anymore. That is, the control unit 110 may display a message saying that the at least one object to be converted does not exist anymore, for example, as a message, "No more item for you" 204 in FIG. 5D on the second layer on the touch screen. Further, the control unit 110 may perform a control such that the second layer, on which the end effect corresponding to, for example, a message such as "No more item for you" 204 is displayed on the touch screen while hiding the first layer, on which the web page is displayed. Accordingly, the end effect corresponding to a message such as "No more item for you" 204 as in FIG. 5D may be displayed while hiding the web page. That is, in FIG. 5D, the search window of the search site is hidden by the end effect corresponding to a message such as "No more item for you" 204. Accordingly, according to an exemplary embodiment, there is an advantage in that a message saying that the at least one object to be converted does not exist anymore may be displayed so as to intuitively notify the user that the scroll for the at least one object is ended. That is, according to the exemplary embodiment, there is an advantage in that a message saying that the at least one object to be converted does not exist anymore is displayed so that the user may be intuitively notified that the scroll for the at least one object has been ended. Further, according to the exemplary embodiment, there is an advantage in that the end effect may be displayed clearly as the second layer displays the end effect while hiding the first layer that displays the at least one object.

In addition, the end effect may be displayed in the region where the at least one object to be converted does not exist anymore. For example, as in FIG. 5D, the control unit 110 may display the top end of the web page, which has not been displayed, on the touch screen in response to the downward drag or flick. Further, while the control unit 110 is displaying the top end of the web page, which has not been displayed, on the touch screen, the top end of the web page to be displayed may not exist anymore. At this time, the control unit 110 may display the end effect at the top end 206 of the web page corresponding to the region where the at least one object to be converted does not exist anymore. That is, the control unit 110 may display the end effect corresponding to a message such as "No more item for you" 204 at the top end 206 of the web page corresponding to the region where the at least one object to be converted does not exist anymore. In addition, the end effect may be displayed in a box type in the region where the at least one object to be converted does not exist anymore. For example, as in FIG. 5D, the end effect may be displayed in the box type 206 at the top end 206 of the web page corresponding to the region where the at least one object to be converted does not exist anymore. Thus, according to an exemplary embodiment of the present invention, there is an advantage in that a message saying that the at least one object to be converted does not exist anymore may be displayed so as to notify the user that the at least one object to be converted does not exist anymore. That is, according to the exemplary embodiment, there is an advantage in that the user may recognize the region where the end effect is displayed to intuitively recognize that the at least one object to be converted does not exist anymore. Thus, according to the exemplary embodiment, there is an advantage in that the end effect is displayed in the region where the at least one object to be converted does not exist anymore so that the user may be notified that the scroll for the at least one object has been ended.

FIGS. 6A to 6D illustrate scenes that display an end effect according to an exemplary embodiment of the present invention. The end effect illustrated in FIGS. 6A to 6D is characterized by displaying additional information.

Figures 6A, 6B, 6C, 6D:
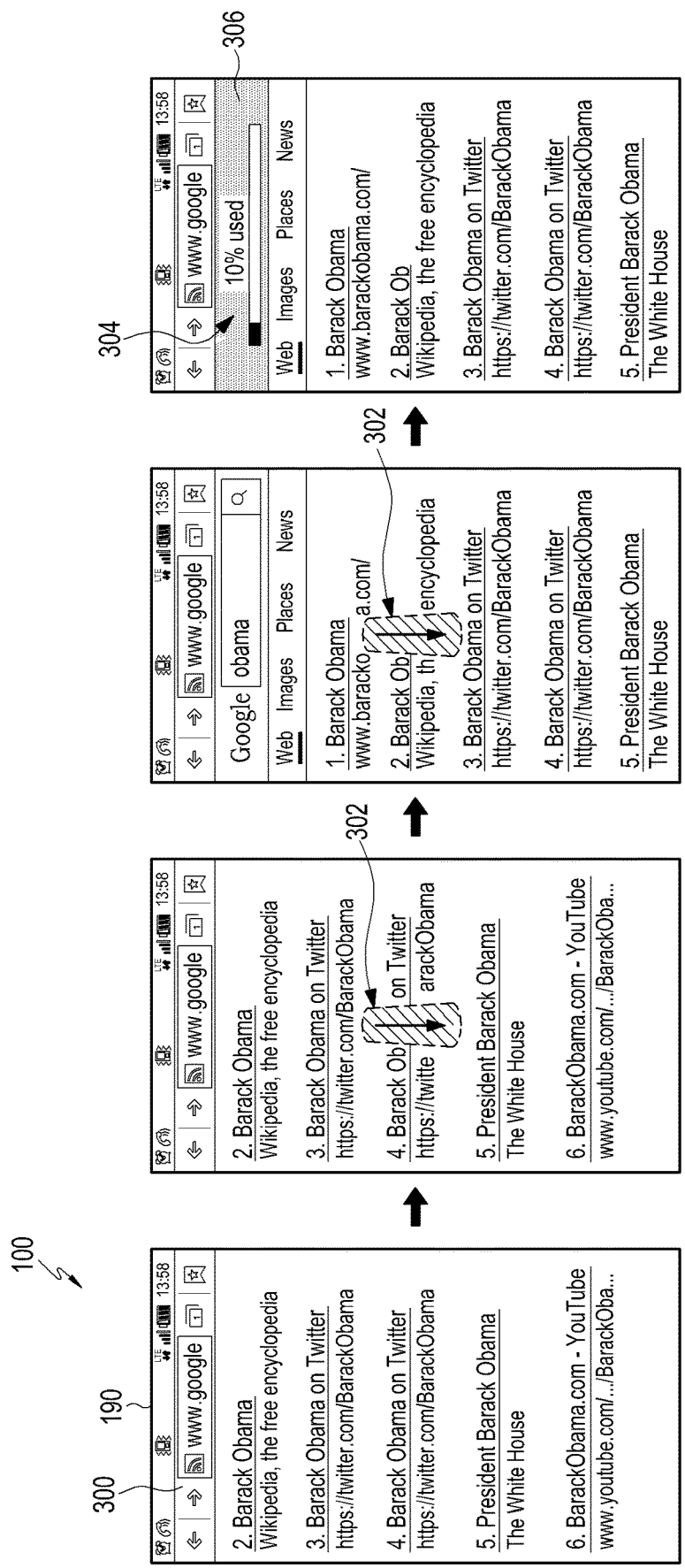
FIGS. 6A to 6D illustrate scenes that display an end effect according to an exemplary embodiment of the present invention.

Referring to FIG. 4 again, the mobile apparatus control method for displaying an end effect displays at least one object on the first layer on the touch screen in step S110. That is, the control unit 110 of the mobile apparatus 100 displays at least one object on the first layer on the touch screen. Also, the at least one object may be formed as a web page, contact information, an image, a text, a video, an audio, an icon, items, a tab, or a combination thereof. Referring to FIG. 6A, the control unit 110 of the mobile apparatus 100 displays at least one object formed as a web page 300 on the first layer of the touch screen 190. The control unit 110 executes a web browser application, and the web page 300 may be displayed on the first layer on the touch screen 190 through the execution of the web browser application. Accordingly, the control unit 110 may show the web page 300 displayed on the first layer on the touch screen 190. At this time, a search site web page is displayed on FIG. 6A. In addition, search results concerning Barack Obama are searched and displayed on the web page.

Next, a first gesture that converts the at least one object is detected in step S120. However, the first gesture may be referred to and described as a gesture. The conversion may be any one of a scroll, a magnification and a reduction. For example, the conversion may be the scroll. At this time, the scroll refers to an operation that moves the at least one object to be displayed on the touch screen. Also, the gesture may be a touch input that converts the at least one object. In addition, the touch input may be at least one of a touch, a drag or a flick that converts the at least one object. For example, referring to FIG. 6B, the control unit 110 may detect a gesture that scrolls a web page which is the at least one object. That is, the control unit 110 may detect a touch input such as a drag or a flick that scrolls the web page. That is, as in FIG. 6B, the control unit 110 may detect a touch input 302 such as a drag or a flick that scrolls the at least one object which is the web page to the lower end of the touch screen 190.

Next, the at least one object is converted in response to the gesture in step S130. That is, the control unit 110 may convert the at least one object in response to the gesture detected in step S120. In addition, the conversion of the at least one object corresponding to the gesture may be preset, and the conversion preset to correspond to the gesture may be stored in the storage unit in advance. For example, the conversion preset to correspond to a touch input such as a drag or a flick may be the scroll. Accordingly, the control unit 110 may scroll at least one object such as a web page in response to a touch input such as a drag or a flick. At this time, the control unit 110 may scroll the at least one object such as a web page in the same direction as the drag or flick direction. That is, as illustrated in FIG. 6C, the control unit 110 may scroll the web page to the lower end of the touch screen 190 in response to the touch input 202 such as a downward drag or flick. At this time, when the web page is scrolled to the lower end, the top end of the web page, which has not been displayed on the touch screen, may be naturally displayed on the touch screen. Accordingly, although in FIG.

6A before the web page is scrolled, the second to sixth items of the search results concerning Barack Obama are displayed on the touch screen, in FIG. 6C after the web page is scrolled to the lower end of the touch screen 190 by the control unit 110, the first to fifth items of the search results concerning Barack Obama and a search window of the search site are displayed on the touch screen. Accordingly, as the control unit 110 scrolls the web page to the lower end of the touch screen 190 in response to the touch input 302 such as a downward drag or flick, the top end of the web page which has not been displayed on the touch screen may be displayed on the touch screen.

Next, it is detected that the conversion for the at least one object is ended in step S140. The control unit 110 may detect that the conversion for the at least one object executed in step S130 is ended. That is, while the conversion for the at least one object is being performed in step S130, the control unit 110 may detect that the conversion for the at least one object is ended. At this time, when the at least one object to be converted does not exist anymore while the conversion for the at least one object is being performed, the control unit 110 may detect that the conversion for the at least one object is ended. For example, while the scroll for the at least one object is being performed, the control unit 110 may detect that the scroll for the at least one object is ended. Referring to FIG. 6C, while the scroll for the at least one object which is a web page is being performed, the control unit 110 may detect that the scroll for the web page is ended. In step S130, while the control unit 110 is scrolling the web page to the lower end of the touch screen in response to the downward drag or flick, the control unit 110 may detect that the scroll for the web page is ended. That is, the control unit 110 may cause the top end of the web page, which has not been displayed, to be displayed on the touch screen in response to the downward drag or flick detected in step S130. In addition, the top end of the web page may not exist anymore while the control unit 110 is causing the top end of the web page, which has not been displayed, to be displayed on the touch screen. At this time, when the top end of the web page to be displayed does not exist anymore, the control unit 110 may detect that the scroll for the web page is ended. Accordingly, while the conversion for the at least one object is being performed, the control unit 110 may detect that the conversion for the at least one object is ended.

Next, when the conversion for the at least one object is ended, an end effect is displayed on the second layer on the touch screen in step S150. When the control unit 110 detects that the conversion for the at least one object is ended in step S140, the control unit 110 displays the end effect on the second layer on the touch screen 190. In addition, the second layer may be displayed on the touch screen while hiding the first layer. At this time, the end effect may be to display additional information. Further, the additional information may comprise at least one of information associated to the application which is currently being executed, information associated with the current status of the mobile apparatus, and contents for memorization. Also, the end effect may be displayed in a region where the at least one object to be converted does not exist anymore. In addition, the end effect may be displayed in a box type in the region where the at least one object to be converted does not exist anymore. For example, the at least one object is a web page and the conversion may be the scroll. Accordingly, in step S140, the control unit 110 may detect that the scroll of the web page is ended. In addition, when it is detected that the scroll of the web page is ended, the control unit 110 may display the end effect on the second layer on the touch screen in step S150.

For example, as in FIG. 6C, when it is detected that the scroll for the web page is ended, the control unit 110 may display the end effect on the second layer on the touch screen as in FIG. 6D. At this time, the end effect may be to display the additional information. In addition, the additional information may be information associated with, for example, the current status of the mobile apparatus. The information associated with the current status of the mobile apparatus may be, for example, information related to CPU usage, the number of updated applications, a used memory capacity, an unused memory capacity, or the current speed of a mobile communication module. That is, as in FIG. 6D, the control unit 110 may display the current CPU usage related information 304 of the mobile apparatus on the second layer on the touch screen as, for example, a text, "10% Used" which means that 10% of the CPU is currently used and a bar type marking. The second layer, on which the end effect corresponding to the additional information associated with the current status of the mobile apparatus such as the text, "10% Used" and the bar type marking is displayed, may be displayed on the touch screen while hiding the first layer. Accordingly, as in FIG. 6D, the end effect corresponding to the additional information which is the information associated with the current status of the mobile apparatus such as the text, "10% Used" and the bar type marking 304 may be displayed while hiding the web page. That is, in FIG. 6D, the search window of the search site is hidden. In addition, the end effect may be displayed in a region where the at least one object to be converted does not exist anymore. For example, as in FIG. 6D, the control unit 110 may display the top end of the web page, which has not been displayed, on the touch screen in response to the downward drag or flick. Further, while the control unit 110 is displaying the top end of the web page, which has not been displayed, on the touch screen, the top end of the web page to be displayed may not exist anymore. At this time, the control unit 110 may display the end effect at the top end 306 of the web page corresponding to the region where the at least one object to be converted does not exist anymore. That is, the control unit 110 may display the end effect corresponding to the additional information associated with the current status of the mobile apparatus such as the text, "10% Used," and the bar type marking at the top end 306 of the web page corresponding to the region where the at least one object to be converted does not exist anymore. In addition, the end effect may be displayed in a box type in the region where the at least one object to be converted does not exist anymore. For example, as in FIG. 6D, the end effect may be displayed in the box type 306 at the top end 306 of the web page corresponding to the region where the at least one object to be converted does not exist anymore. Thus, according to an exemplary embodiment of the present invention, there is an advantage in that the end effect including the additional information is displayed so that the user may not only be intuitively notified that the conversion for the at least one object is ended, but also concurrently be informed of the additional information. In addition, according to the exemplary embodiment, there is an advantage in that the end effect including the additional information is displayed so that the user may be provided with information associated with the currently executed application, information associated with the current status of the mobile apparatus, or contents for memorization.

Figures 8A, 8B:
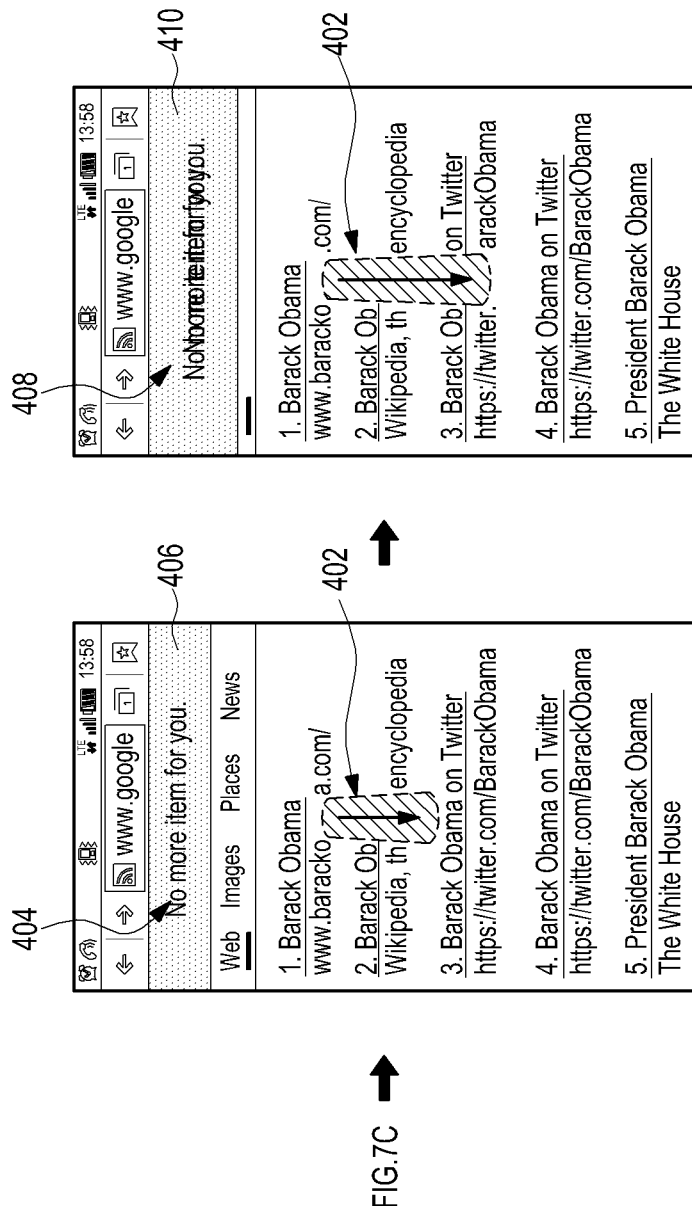

FIGS. 7A and 8B illustrate scenes that display an end effect according to an exemplary embodiment of the present invention. The end effect illustrated in FIGS. 7A to 8B are characterized in that the end effect is displayed in response to a case where the detected length of the gesture is longer than a preset length. In addition, the end effect illustrated in FIGS. 7A to 8B are an oscillating effect.

Referring to FIG. 4 again, a mobile apparatus control method for displaying an end effect according to an exemplary embodiment of the present invention displays at least one object on a first layer on the touch screen in step S110. That is, the control unit 110 of the mobile apparatus 100 displays at least one object on the first layer on the touch screen. Also, the at least one object may be formed as a web page 400, contact information, an image, a text, a video, an audio, an icon, items, a tab, or a combination thereof. Referring to FIG. 7A, the control unit 110 of the mobile apparatus 100 displays at least one object formed as a web page 400 on the first layer of the touch screen 190. The control unit 110 executes a web browser application, and the web page 400 may be displayed on the first layer on the touch screen 190 through the execution of the web browser application. Accordingly, the control unit 110 may show the web page 400 displayed on the first layer on the touch screen 190. At this time, a search site web page is displayed on FIG. 7A. In addition, search results concerning Barack Obama are searched and displayed on the web page.

Next, a first gesture that converts the at least one object is detected in step S120. However, the first gesture may be referred to and described as a gesture. The conversion may be any one of a scroll, a magnification and a reduction. For example, the conversion may be the scroll. At this time, the scroll refers to an operation that moves the at least one object to be displayed on the touch screen. Also, the gesture may be a touch input that converts the at least one object. In addition, the touch input may be at least one of a touch, a drag or a flick that converts the at least one object. For example, referring to FIG. 7B, the control unit 110 may detect a gesture that scrolls a web page which is the at least one object. That is, the control unit 110 may detect a touch input such as a drag or a flick that scrolls the web page. That is, as in FIG. 7B, the control unit 110 may detect a touch input 402 such as a drag or a flick that scrolls the at least one object which is the web page to the lower end of the touch screen 190.

Next, the at least one object is converted in response to the gesture in step S130. That is, the control unit 110 may convert the at least one object in response to the gesture detected in step S120. In addition, the conversion of the at least one object corresponding to the gesture may be preset, and the conversion preset to correspond to the gesture may be stored in the storage unit in advance. For example, the conversion preset to correspond to a touch input such as a drag or a flick may be the scroll. Accordingly, the control unit 110 may scroll at least one object such as a web page in response to a touch input such as a drag or a flick. At this time, the control unit 110 may scroll the at least one object such as a web page in the same direction as the drag or flick direction. That is, as illustrated in FIG. 7C, the control unit 110 may scroll the web page to the lower end of the touch screen 190 in response to the touch input 402 such as a downward drag or flick. At this time, when the web page is scrolled to the lower end, the top end of the web page, which has not been displayed on the touch screen, may be naturally displayed on the touch screen. Accordingly, although in FIG. 7A before the web page is scrolled, the second to sixth items of the search results concerning Barack Obama are displayed on the touch screen, in FIG. 7C after the web page is scrolled to the lower end of the touch screen 190 by the control unit 110, the first to fifth items of the search results concerning Barack Obama and a search window of the search site are displayed on the touch screen. Accordingly, as the control unit 110 scrolls the web page to the lower end of the touch screen 190 in response to the touch input 402 such as a downward drag or flick, the top end of the web page which has not been displayed on the touch screen may be displayed on the touch screen.

Next, it is detected that the conversion for the at least one object is ended in step S140. The control unit 110 may detect that the conversion for the at least one object executed in step S130 is ended. That is, while the conversion for the at least one object is being performed in step S130, the control unit 110 may detect that the conversion for the at least one object is ended. At this time, when the at least one object to be converted does not exist anymore while the conversion for the at least one object is being performed, the control unit 110 may detect that the conversion for the at least one object is ended. For example, while the scroll for the at least one object is being performed, the control unit 110 may detect that the scroll for the at least one object is ended. Referring to FIG. 7C again, while the scroll for the at least one object which is a web page is being performed, the control unit 110 may detect that the scroll for the web page is ended. In step S130, while the control unit 110 is scrolling the web page to the lower end of the touch screen in response to the downward drag or flick, the control unit 110 may detect that the scroll for the web page is ended. That is, the control unit 110 may cause the top end of the web page, which has not been displayed, to be displayed on the screen in response to the downward drag or flick detected in step S130. In addition, the top end of the web page may not exist anymore while the control unit 110 is causing the top end of the web page, which has not been displayed, to be displayed on the touch screen. At this time, when the top end of the web page to be displayed does not exist anymore, the control unit 110 may detect that the scroll for the web page is ended. Accordingly, while the conversion for the at least one object is being performed, the control unit 110 may detect that the conversion for the at least one object is ended.

Next, when the conversion for the at least one object is ended, an end effect is displayed on the second layer on the touch screen in step S150. When the control unit 110 detects that the conversion for the at least one object is ended in step S140, the control unit 110 displays the end effect on the second layer on the touch screen 190. In addition, the second layer may be displayed on the touch screen while hiding the first layer. At this time, the end effect may be to display a message saying that the at least one object to be converted does not exist anymore. Also, the end effect may be displayed in a region where the at least one object to be converted does not exist anymore. In addition, the end effect may be displayed in a box type in the region where the at least one object to be converted does not exist anymore. For example, the at least one object is a web page and the conversion may be the scroll. Accordingly, in step S140, the control unit 110 may detect that the scroll of the web page is ended. In addition, when it is detected that the scroll of the web page is ended, the control unit 110 may display the end effect on the second layer on the touch screen in step S150. For example, as in FIG. 7C, when it is detected that the scroll for the web page is ended, the control unit 110 may display the end effect on the second layer on the touch screen as in FIG. 8A. At this time, the second layer, on which the end effect is displayed, may be displayed on the touch screen while hiding the first layer, on which the web page is displayed. In addition, the end effect may be to display a message saying that the at least one object to be converted does not exist anymore. That is, the control unit 110 may display a message saying that the at least one object to be converted does not exist anymore, for example, as a message, "No more item for you" 404 as in FIG. 8A on the second layer on the touch screen. Further, the control unit 110 may perform a control such that the second layer, on which the end effect corresponding to, for example, a message such as "No more item for you" 404 is displayed on the touch screen while hiding the first layer, on which the web page is displayed. Accordingly, the end effect corresponding to a message such as "No more item for you" 404 as in FIG. 8A may be displayed while hiding the web page. That is, in FIG. 8A, the search window of the search site is hidden by the end effect corresponding to a message such as "No more item for you" 404. In addition, the end effect may be displayed in the region where the at least one object to be converted does not exist anymore. For example, as in FIG. 8A, the control unit 110 may display the top end of the web page, which has not been displayed, on the touch screen in response to the downward drag or flick. Further, while the control unit 110 is displaying the top end of the web page, which has not been displayed, on the touch screen, the top end of the web page to be displayed may not exist anymore. At this time, the control unit 110 may display the end effect at the top end 406 of the web page corresponding to the region where the at least one object to be converted does not exist anymore. That is, the control unit 110 may display the end effect corresponding to a message such as "No more item for you" 404 at the top end 406 of the web page corresponding to the region where the at least one object to be converted does not exist anymore. In addition, the end effect may be displayed in a box type in the region where the at least one object to be converted does not exist anymore. For example, as in FIG. 8A, the end effect may be displayed in the box type 406 at the top end 406 of the web page corresponding to the region where the at least one object to be converted does not exist anymore.

In addition, the end effect may be displayed in response to a case where the detected length of the gesture is longer than a preset length. The control unit 110 may detect a gesture that converts the at least one object. That is, even after detecting that the conversion for the at least one object is ended in step S140, the control unit 110 may detect a gesture that converts the at least one object. Further, the control unit 110 may detect the length of the gesture. At this time, the control unit 110 may display the end effect in response to the case where the detected length of the gesture is longer than the preset length. Moreover, the end effect may be an oscillating effect. Accordingly, the control unit 110 may display the end effect as the oscillating effect in response to the case where the detected length of the gesture is longer than the preset distance.

For example, as in FIG. 8B, even after it is detected that the conversion for the at least one object is ended in step S140, the control unit 110 may detect the gesture 402 that converts the at least one object. Also, the control unit 110 may detect the length of the gesture 402. In addition, the control unit 110 may display the end effect in response to the case where the detected length of the gesture is longer than the preset length. That is, when the detected distance of the gesture is longer than the preset length, the control unit 110 may display the end effect in response to the detected length of the gesture. For example, in response to the case where the detected length of the gesture is longer than the preset length, the control unit 110 may also display the end effect to become longer so as to be elongated. In addition, in response to the case where the detected length of the gesture is longer than the preset length, the control unit 110 may display the end effect to become longer in the direction which is the same as the direction of the gesture.

For example, as in FIG. 8B, it can be seen the gesture of FIG. 8B is longer than the gesture illustrated in FIG. 8B. At this time, the control unit 110 may also display the end effect longer in response to a case where the detected length of the gesture is longer than the preset length. That is, as in FIG. 8B, the end effect corresponding to the message such as "No more item for you" 404 may be displayed to become longer in response to the detected length of the gesture.

In addition, in response to the case where the detected length of the gesture is longer than the preset length, the control unit 110 may display the end effect to become longer in the direction which is the same as the direction of the gesture. For example, the control unit 110 may display the end effect, which is displayed in the box type in the region where the at least one object to be converted to become longer in the direction which is the same as the direction of the gesture does not exist anymore. As in FIG. 8B, the control unit 110 may display the end effect, which is displayed in the box type in the region where the at least one object to be converted does not exist anymore, to become longer in the direction which is the same as the direction of the gesture corresponding to the downward drag or flick (reference numeral 410). That is, the control unit 110 may display the end effect to become longer downward (reference numeral 410) in the downward direction which is the same as the direction of the gesture.

Also, the end effect may be a conversion effect. Further, in response to the case where the detected length of the gesture is longer than the preset length, the control unit 110 may display the end effect as a conversion effect. In addition, the conversion effect may be to impose an oscillating effect or a distortion effect on the message or the additional information. For example, as in FIG. 8B, the control unit 110 may display the end effect corresponding to the message such as "No more item for you" 408 in the conversion effect. In addition, the control unit 110 may impose an oscillating effect on the end effect corresponding to the message such as "No more item for you" 408. The oscillating effect may be an effect of vibrating the end effect corresponding to the message such as "No more item for you" 404 in a preset direction. For example, as in FIG. 8B, the oscillating effect may be an effect of vibrating the end effect corresponding to the message such as "No more item for you" 408 left and right which correspond to the predetermined direction. In addition, the control unit 110 may impose a distortion effect on the end effect corresponding to the message such as "No more item for you" 408. The distortion effect may be an effect of distorting the form of the end effect corresponding to the message such as "No more item for you" 408.

Thus, according to an exemplary embodiment of the present invention, there is an advantage in that the user may be additionally notified that the conversion for the at least one object is ended as the end effect is displayed in response to the case where the detected length of the gesture is longer than the preset length. That is, according to the exemplary embodiment of the present invention, there is an advantage in that since the end effect may be displayed in response to the detected length of the gesture even after the end effect is displayed, the user may be additionally notified that the conversion for the at least one object is ended. Moreover, according to the exemplary embodiment of the present invention, there is also an advantage in that as the end effect with a conversion effect is displayed, the user may be additionally notified that the conversion for the at least one object is ended.

Figure 9:
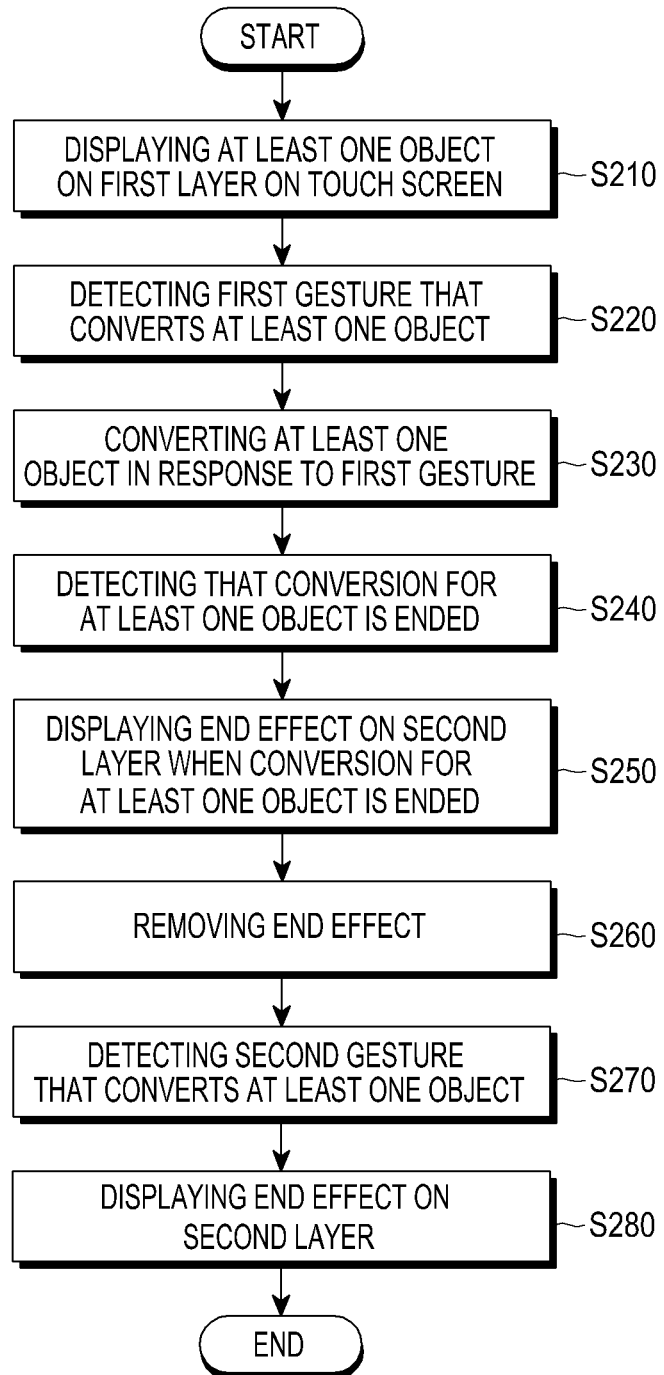
FIG. 9 is a flowchart illustrating a method of controlling a mobile apparatus to display an end effect according to another exemplary embodiment of the present invention.

FIG. 9 is a flowchart related to a mobile apparatus control method for displaying an end effect according to another exemplary embodiment of the present invention. FIGS. 10A to 11C illustrate scenes that display an end effect according to another exemplary embodiments of the present invention.

Referring to FIG. 9, a mobile apparatus control method for displaying an end effect according to the exemplary embodiment of the present invention displays at least one object on a first layer on the touch screen in step S210. That is, the control unit 110 of the mobile apparatus 100 displays at least one object on the first layer on the touch screen. Also, the at least one object may be formed as a web page, contact information, an image, a text, a video, an audio, an icon, items, a tab, or a combination thereof. At this time, the first layer may be included in at least one layer and a screen of the mobile apparatus may be displayed through the at least one layer. Also, the second layer may be included in the at least one layer. Accordingly, the control unit 110 may show at least one object to the user displayed on the first layer on the touch screen. Referring to FIG. 10A, the control unit 110 of the mobile apparatus 100 displays at least one object formed as a web page 500 on the first layer of the touch screen 190. The control unit 110 may execute a web browser application, and the web page 500 may be displayed on the first layer on the touch screen 190 through the execution of the web browser application. Accordingly, the control unit 110 may show the web page 500 displayed on the first layer on the touch screen 190. At this time, a search site web page is displayed on FIG. 10A. In addition, search results concerning Barack Obama are searched and displayed on the web page.

Next, a first gesture that converts the at least one object is detected in step S220. The conversion may be any one of a scroll, a magnification and a reduction. For example, the conversion may be the scroll. At this time, the scroll refers to an operation that moves the at least one object to be displayed on the touch screen. Also, the first gesture may be a touch input that converts the at least one object. In addition, the touch input may be at least one of a touch, a drag or a flick that converts the at least one object. For example, referring to FIG. 10B, the control unit 110 may detect the first gesture 502 that scrolls a web page which is the at least one object. That is, the control unit 110 may detect a touch input such as a drag or a flick that scrolls the web page. That is, as in FIG. 10B, the control unit 110 may detect a touch input 502 such as a drag or a flick that scrolls the at least one object which is the web page to the lower end of the touch screen 190.

Next, the at least one object is converted in response to the first gesture in step S230. That is, the control unit 110 may convert the at least one object in response to the gesture detected in step S220. In addition, the conversion of the at least one object corresponding to the first gesture may be preset, and the conversion preset to correspond to the first gesture may be stored in the storage unit in advance. At this time, as described in step S210 and step S220, the at least one object may be formed as a web page, contact information, an image, a text, a video, an audio, an icon, an item, a tab or a combination thereof, and the conversion may be one of a scroll, a magnification and a reduction. Also, the first gesture may be a touch input that converts the at least one object. For example, the conversion preset to correspond to a touch input such as a drag or a flick may be the scroll. Accordingly, the control unit 110 may scroll at least one object such as a web page in response to a touch input such as a drag or a flick. At this time, the control unit 110 may scroll the at least one object such as a web page in the same direction as the drag or flick direction. That is, as illustrated in FIG. 10C, the control unit 110 may scroll the web page to the lower end of the touch screen 190 in response to the touch input 502 such as a downward drag or flick. At this time, when the web page is scrolled to the lower end, the top end of the web page, which has not been displayed on the touch screen, may be naturally displayed on the touch screen. Accordingly, although in FIG. 10A before the web page is scrolled, the second to sixth items of the search results concerning Barack Obama are displayed on the touch screen, in FIG. 10C after the web page is scrolled to the lower end of the touch screen 190 by the control unit 110, the first to fifth items of the search results concerning Barack Obama and a search window of the search site are displayed on the touch screen. Accordingly, as the control unit 110 scrolls the web page to the lower end of the touch screen 190 in response to the touch input 502 such as a downward drag or flick, the top end of the web page which has not been displayed on the touch screen may be displayed on the touch screen.

Next, it is detected that the conversion for the at least one object is ended in step S240. The control unit 110 may detect that the conversion for the at least one object executed in step S230 is ended. That is, while the conversion for the at least one object is being performed in step S230, the control unit 110 may detect that the conversion for the at least one object is ended. At this time, when the at least one object to be converted does not exist anymore while the conversion for the at least one object is being performed, the control unit 110 may detect that the conversion for the at least one object is ended. For example, while the scroll for the at least one object is being performed, the control unit 110 may detect that the scroll for the at least one object is ended. Referring to FIG. 10C again, while the scroll for the at least one object which is a web page is being performed, the control unit 110 may detect that the scroll for the web page is ended. In step S230, while the control unit 110 is scrolling the web page to the lower end of the touch screen in response to the downward drag or flick, the control unit 110 may detect that the scroll for the web page is ended. That is, the control unit 110 may cause the top end of the web page, which has not been displayed, to be displayed on the screen in response to the downward drag or flick detected in step S230. In addition, the top end of the web page may not exist anymore while the control unit 110 is causing the top end of the web page, which has not been displayed, to be displayed on the touch screen. At this time, when the top end of the web page to be displayed does not exist anymore, the control unit 110 may detect that the scroll for the web page is ended. Accordingly, while the conversion for the at least one object is being performed, the control unit 110 may detect that the conversion for the at least one object is ended.

Next, when the conversion for the at least one object is ended, an end effect is displayed on the second layer on the touch screen in step S250. When the control unit 110 detects that the conversion for the at least one object is ended in step S240, the control unit 110 displays the end effect on the second layer on the touch screen 190. At this time, the second layer is included in the at least one layer described in step S210, and the screen of the mobile apparatus may be displayed through the at least one layer. Accordingly, the control unit 110 may show the end effect displayed on the second layer on the touch screen to the user. In addition, the second layer may be displayed on the touch screen while hiding the first layer. Accordingly, the second layer where the end effect is displayed may be displayed on the touch screen while hiding the first layer where the at least one object is displayed.

At this time, the end effect is the same as the end effect described with reference to FIG. 5D or FIG. 6D. Therefore, it will be briefly described. That is, the end effect may be to display a message saying that the at least one object to be converted does not exist anymore. Also, the end effect may be displayed in a region where the at least one object to be converted does not exist anymore. In addition, the end effect may be displayed in a box type in the region where the at least one object to be converted does not exist anymore. In addition, the end effect may be to display additional information. In addition, the additional information may be any one of information associated with currently executed application, information associated with the current status of the mobile apparatus, and contents for memorization.

For example, the control unit 110 may display a message that "the at least one object to be converted does not exist anymore", as a message, for example, "No more item for you" 504 in FIG. 11A on the second layer on the touch screen. Further, the control unit 110 may display an end effect corresponding to a message such as "No more item for you" 504 at the top end 506 of the web page corresponding to the region where the at least one object to be converted does not exist anymore. In addition, the end effect may be displayed in a box type in the region where the at least one object to be converted does not exist anymore. For example, as in FIG. 11A, the end effect may be displayed in the box type 506 at the top end 506 of the web page corresponding to the region where the at least one object to be converted does not exist anymore.

Next, the end effect is removed from the touch screen in step S260. The control unit 110 removes the end effect from the touch screen. That is, the control unit 110 may remove the end effect, which is displayed on the second layer in step S250 as described above, from the touch screen. At this time, the control unit 110 may remove the end effect from the touch screen after a predetermined length of time after the end effect is displayed in step S250. For example, the control unit 110 may remove the end effect corresponding to the message such as "No more item for you" 504 displayed on the second layer in FIG. 11A from the touch screen 190. Then, as in FIG. 11B, only the at least one object displayed on the first layer may be displayed on the touch screen. That is, as in FIG. 11B, only the web page displayed on the first layer may be displayed on the touch screen.

Next, a second gesture that converts the at least one object is detected in step S270. The second gesture refers to a gesture detected after the end effect is removed in step S260 as described above. Therefore, the second gesture may be different from the first gesture. And, the second gesture may be a touch input that converts the at least one object. Also, the touch input may be at least one of a touch, a drag or a flick that converts the at least one object. Accordingly, the second gesture may be a gesture which is the same type as the first gesture. For example, both the second gesture and the first gesture may be a touch input such as a drag or a flick. However, since the second gesture refers to a gesture detected after the end effect is removed in step S260 as described above, it is different from the first gesture. For example, referring to FIG. 11B, the control unit 110 may detect a second gesture 512 that scrolls the web page which is the at least one object. That is, the control unit 110 may detect the second gesture 512 that scrolls the web page which is the at least one object after the end effect is removed in step S260 as described above. For example, as in FIG. 11B, after the end effect is removed in step S260 as described above, the control unit 110 may detect a touch input 512 such as a drag or a flick that scrolls the at least one object which is the web page to the lower end of the touch screen 190.

Next, the end effect is displayed on the second layer on the touch screen in step S280. That is, when the second gesture is detected in step 260 as described above, the control unit 110 may display the end effect on the second layer on the touch screen. Accordingly, the control unit 110 displays the end effect in step S250 as described above, removes the end effect in step S260 as described above, and then displays the end effect again when the second gesture that converts the at least one object is detected in step S270.

At this time, the end effect is the same at the end effect as illustrated in FIG. 5D or FIG. 6D. Accordingly, it will be briefly described. That is, the end effect may be to display a message saying that the at least one object does not exist anymore. In addition, the end effect may be displayed in a region where the at least one object to be converted does not exist anymore. In addition, the end effect may be displayed in a box type in the region where the at least one object to be converted does not exist anymore. And, the end effect may be to display additional information. Also, the additional information may be any one of information associated with a currently executed application, information associated with the current status of the mobile apparatus, and contents for memorization.

For example, as in FIG. 11C, the control unit 110 may display the current CPU usage related information 514 of the mobile apparatus on the second layer on the touch screen as, for example, a text, "10% Used" saying that 10% of the CPU is currently used and a bar type marking. And, the control unit 110 may display the end effect corresponding to the additional information which is associated with the current status of the mobile apparatus the second layer such as the text, "10% Used" and the bar type marking on the top end 516 of the web page corresponding to the region where the at least one object to be converted does not exist anymore in a box type 516.

Accordingly, according to the present exemplary embodiment, there is an advantage in that since the end effect is displayed again in response to the gesture detected after the end effect is removed, it is possible to notify the user once again that the conversion for the at least one object has been ended. That is, according to the present exemplary embodiment, there is an advantage in that it is possible to notify the user once again that the conversion for the at least one object has been ended when the gesture that converts the at least one object is detected after the end effect was removed.

FIGS. 12A to 13B illustrate scenes that display an end effect according to a first example of an exemplary embodiment of the present invention.

Figures 12A, 12B, 12C:
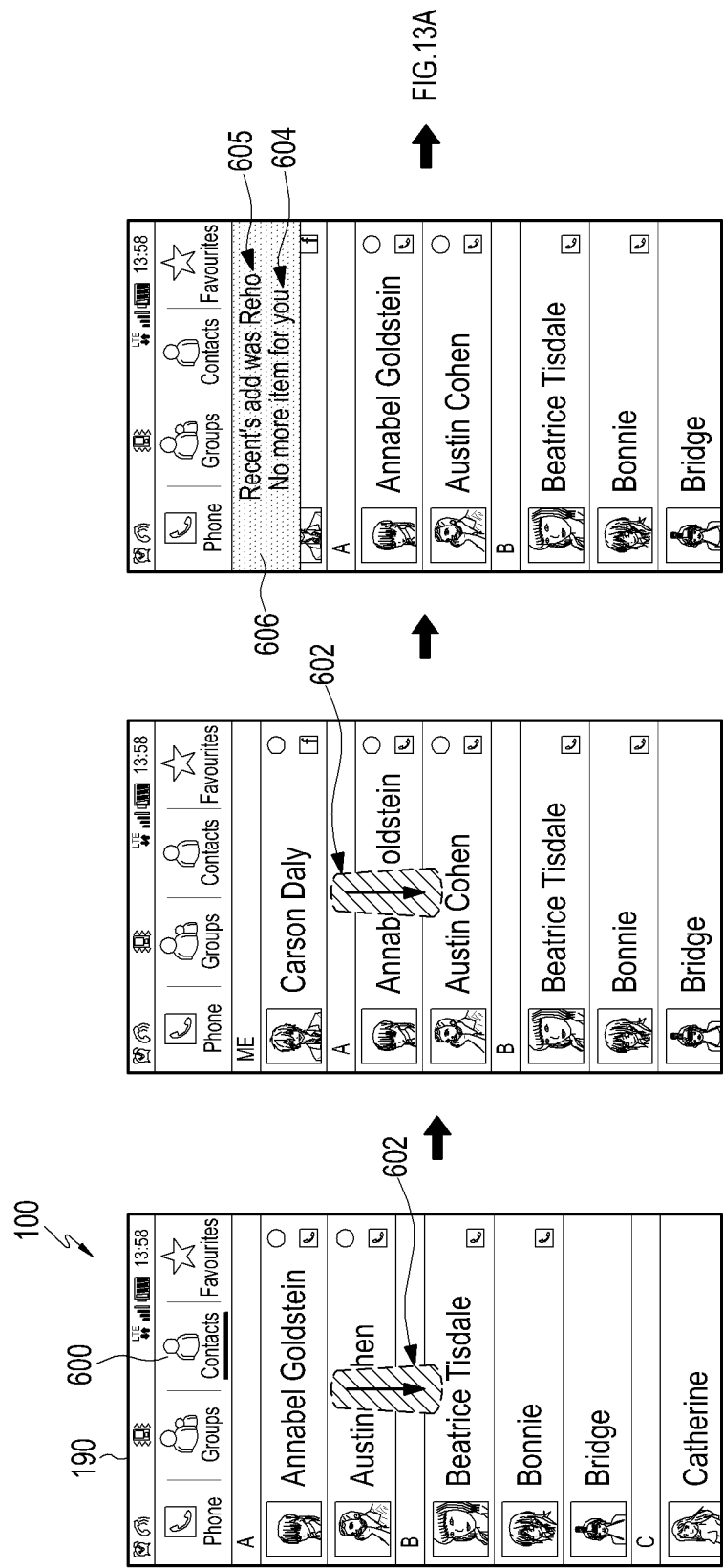

Referring to FIG. 9 again, a mobile apparatus control method for displaying an end effect according to another exemplary embodiment of the present invention displays at least one object on a first layer on the touch screen in step S210. That is, the control unit 110 of the mobile apparatus 100 displays at least one object on the first layer on the touch screen. And, the at least one object may be formed as a web page, contact information, an image, a text, a video, an audio, an icon, items, a tab, or a combination thereof. For example, the at least one object may be contact information. And, at least one contact point corresponding to the at least one object may form a contact list. Referring to FIG. 12A, the control unit 110 of the mobile apparatus 100 displays at least one object formed as a contact list 600 on the first layer of the touch screen 190. That is, the control unit 110 may execute a contact application, and the contact list 600 may be displayed on the first layer on the touch screen 190 through the execution of the contact application.

Next, a first gesture that converts the at least one object is detected in step S220. The conversion may be any one of a scroll, a magnification and a reduction. For example, the conversion may be the scroll. At this time, the scroll refers to an operation that moves the at least one object to be displayed on the touch screen. And, the first gesture may be a touch input that converts the at least one object. In addition, the touch input may be at least one of a touch, a drag or a flick that converts the at least one object. For example, referring to FIG. 12B, the control unit 110 may detect the first gesture 602 that scrolls contact information which is the at least one object. That is, the control unit 110 may detect a touch input such as a drag or a flick that scrolls the contact point. That is, as in FIG. 12B, the control unit 110 may detect a touch input 602 such as a drag or a flick that scrolls the at least one object which is the contact point to the lower end of the touch screen 190.

Next, the at least one object is converted in response to the first gesture in step S230. For example, as in FIG. 12A, the conversion preset to correspond to the touch input such as a drag or a flick may be the scroll. Accordingly, the control unit 110 may scroll at least one object such as contact information in response to a touch input such as a downward drag or flick. That is, as illustrated in FIG. 12A, the control unit 110 may scroll the contact point to the lower end of the touch screen 190 in response to the touch input 602 such as a downward drag or flick.

Next, it is detected that the conversion for the at least one object is ended in step S240. The control unit 110 may detect that the conversion for the at least one object executed in step S230 is ended. For example, as in FIG. 12B, while the scroll for the at least one object which is the contact point is being performed, the control unit 110 may detect that the scroll for the contact point is ended. That is, when the top end of the contact point to be displayed does not exist anymore, the control unit 110 may detect that the scroll for the contact point is ended.

Next, when the conversion for the at least one object is ended, the end effect is displayed on the second layer on the touch screen in step S250. For example, the control unit 110 may display, as the end effect, a message saying that "at least one object to be converted does not exist anymore" on the second layer on the touch screen, for example, as "No more item for you" 602 as in FIG. 12C. And, the control unit 110 may display the end effect corresponding to the message such as "No more item for you" 604 at the top end 606 of the contact point which corresponds to the region where the at least one object to be converted does not exist anymore. Therefore, according to the present exemplary embodiment, there is an advantage in that the message saying that the contact point to be scrolled does not exist anymore is displayed so that the user may be intuitively notified that the scroll for the contact point has been ended.

In addition, for example, the control unit 110 may display additional information as the end effect as in FIG. 12C. And, the additional information may be information associated with currently executed application. As in FIG. 12C, the control unit 110 may display the information associated with the contact application which is the currently executed application as the end effect. For example, the information associated with the contact application may be the most recently added contact point information. Accordingly, as in FIG. 12C, the control unit 110 may display additional information saying that the most recently added contact point is Reho as a message, "Recent's add was Reho" 605. Therefore, according to the present exemplary embodiment, there is an advantage in that the end effect including the information associated with the currently executed application is displayed so that the user may not only be intuitively notified that the scroll for the contact point has been ended, but also be informed of the information associated with the currently executed application.

Next, the end effect is removed from the touch screen in step S260. For example, the control unit 110 may remove the message such as "No more item for you" 604 displayed on the second layer in FIG. 12C and the end effect which is the additional information corresponding to "'Recent's add was Reho" 605 from the touch screen 190.

Next, the second gesture that converts the at least one object is detected in step S270. For example, after the end effect has been removed in step S260 as in FIG. 13A, the control unit 110 may detect the second gesture corresponding to the touch input 612 such as a drag or a flick that scrolls the at least one object which is the contact point to the lower end of the touch screen 190.

Next, the end effect is displayed on the second layer on the touch screen in step S280.

Figures 13A, 13B:
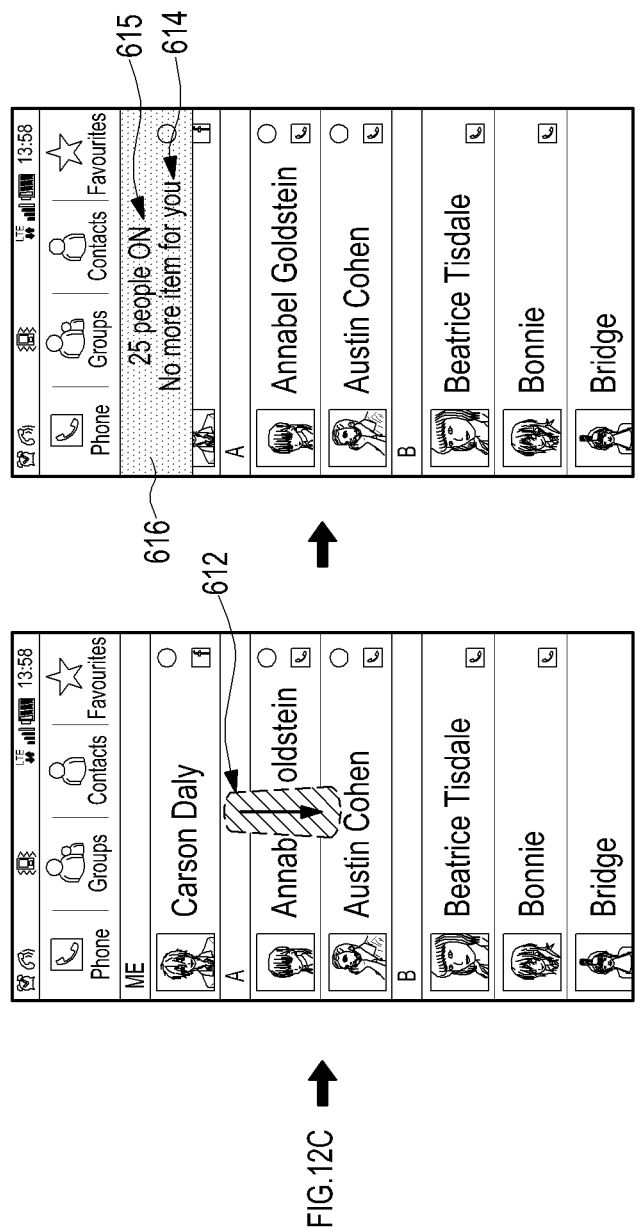

For example, as in FIG. 13B, the control unit 110 may display, as the end effect, the message saying that "the at least one object to be converted does not exist anymore" on the second layer on the touch screen, for example, as "No more item for you" 614. And, the control unit 110 may display the end effect corresponding to the message such as "No more item for you" 614 at the top end 616 of the contact point which corresponds to the region where the at least one object to be converted does not exist anymore.

In addition, for example, the control unit 110 may display additional information as the end effect as in FIG. 13B. And, the additional information may be information associated with a currently executed application. As in FIG. 13B, the control unit 110 may display the information associated with the contact application which is the currently executed application. For example, the information associated with the contact application may be the number of persons whose mobile apparatuses are currently activated (ON). Accordingly, as in FIG. 13B, the control unit 110 may display the additional information saying that the number of persons whose mobile apparatuses are currently activated (ON) is 25, for example, as "25 people ON" 615.

Thus, according to the present exemplary embodiment, there is an advantage in that when a gesture that scrolls the contact point is detected again after the end effect has been removed, the message saying that the contact point to be scrolled does not exist is displayed so that the user may be intuitively notified that the scroll for the contact point has been ended or concurrently, be informed of the additional information including the information associated with the currently executed application.

FIGS. 14A to 15C illustrate scenes that display an end effect according to a second example of an exemplary embodiment of the present invention.

Referring to FIG. 9 again, a mobile apparatus control method for displaying an end effect according to another exemplary embodiment of the present invention displays at least one object on a first layer on the touch screen in step S210. That is, the control unit 110 of the mobile apparatus 100 displays at least one object on the first layer on the touch screen. And, the at least one object may be formed as a web page, contact information, an image, a text, a video, an audio, an icon, items, a tab, or a combination thereof. For example, the at least one object may be an image. And, the image may form a gallery.

Referring to FIG. 14A, the control unit 110 of the mobile apparatus 100 displays at least one object formed as a gallery on the first layer of the touch screen 190. That is, the control unit 110 may execute a gallery application, and the image 720 may be displayed on the first layer on the touch screen 190 through the execution of the gallery application.

Next, a first gesture that converts the at least one object is detected in step S220. At this time, the conversion may be any one of a scroll, a magnification and a reduction. For example, the conversion may be the scroll. At this time, the scroll refers to an operation that moves the at least one object to be displayed on the touch screen. And, the first gesture may be a touch input that converts the at least one object. In addition, the touch input may be at least one of a touch, a drag or a flick that converts the at least one object. For example, referring to FIG. 14A, the control unit 110 may detect the first gesture 702 that scrolls an image 720 which is the at least one object. That is, the control unit 110 may detect a touch input such as a drag or a flick that scrolls the image. That is, as in FIG. 14A, the control unit 110 may detect a touch input 702 such as a drag or a flick that scrolls the at least one object which is the image 720 to the right side of the touch screen 190.

Next, the at least one object is converted in response to the first gesture in step S230. For example, as in FIGS. 14A and 14B, the conversion preset to correspond to the touch input such as a drag or a flick may be the scroll. Accordingly, the control unit 110 may scroll at least one object such as an image 720 in response to a touch input 702 such as a downward drag or flick and then display image 730. That is, as illustrated in FIGS. 14A and 14B, the control unit 110 may scroll the image 720 to the right side of the touch screen 190 in response to the touch input 702 such as a rightward drag or flick and then display image 730.

Next, it is detected that the conversion for the at least one object is ended in step S240. The control unit 110 may detect that the conversion for the at least one object executed in step S230 is ended.

For example, as in FIG. 14C, while the scroll for the at least one object which is the image is being performed, the control unit 110 may detect that the scroll for the image 720 is ended. That is, when the image 720 to be displayed does not exist anymore, the control unit 110 may detect that the scroll for the image is ended.

Next, when the conversion for the at least one object is ended, the end effect is displayed on the second layer on the touch screen in step S250.

Figure 15C:
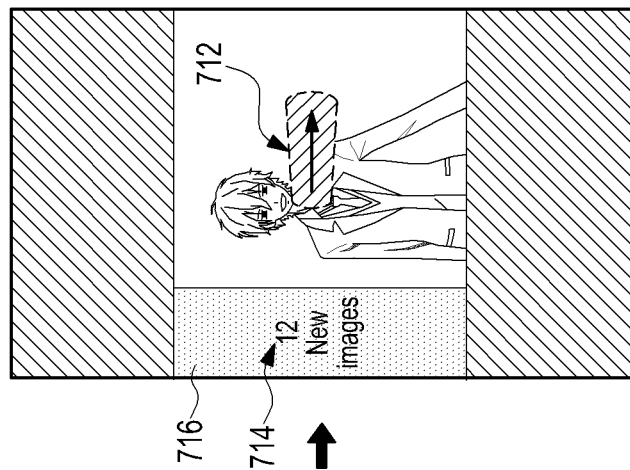
Figure 15B:
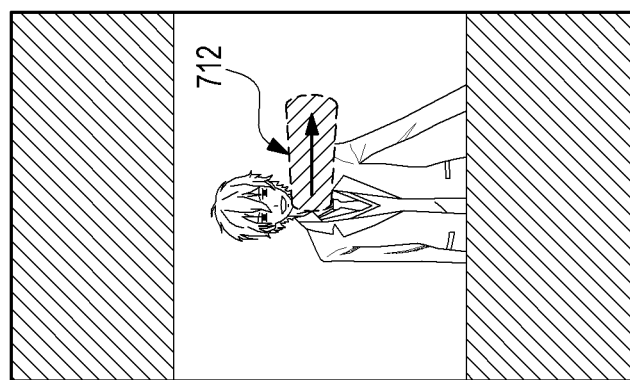
Figure 15A:
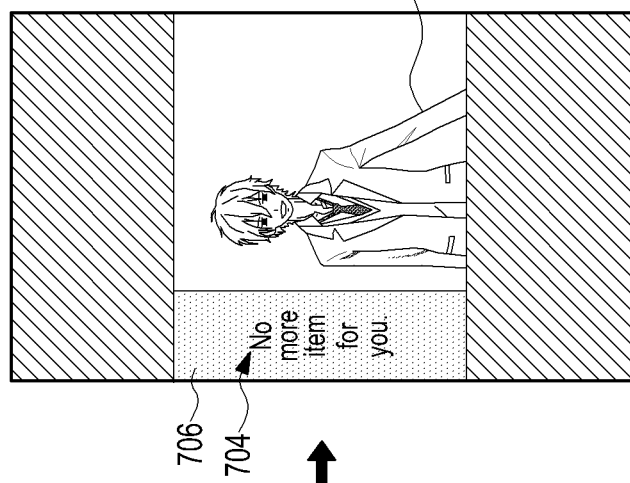

For example, the control unit 110 may display, as the end effect, a message saying that "at least one object to be converted does not exist anymore" on the second layer on the touch screen, for example, as "No more item for you" 704 as in FIG. 15A. And, the control unit 110 may display the end effect corresponding to the message such as "No more item for you" 704 at the left side 706 of the image 730 which corresponds to the region where the at least one object to be converted does not exist anymore. Therefore, according to the present exemplary embodiment, there is an advantage in that the message saying that the image to be scrolled does not exist anymore is displayed so that the user may be intuitively notified that the scroll for the image has been ended.

Next, the end effect is removed from the touch screen in step S260. For example, the control unit 110 may remove the end effect corresponding to the message such as "No more item for you" 704 displayed on the second layer in FIG. 15B from the touch screen 190.

Next, the second gesture that converts the at least one object is detected in step S270. For example, after the end effect has been removed in step S260 as in FIG. 15B, the control unit 110 may detect the second gesture corresponding to the touch input 712 such as a drag or a flick that scrolls the at least one object which is the image to the right side of the touch screen 190.

Next, the end effect is displayed on the second layer on the touch screen in step S280.

For example, the control unit 110 may display additional information as the end effect as in FIG. 15C. And, the additional information may be information associated with a currently executed application. As in FIG. 15C, the control unit 110 may display the information associated with the gallery application which is the currently executed application. For example, the information associated with the gallery application may be the number of images which are newly stored. Accordingly, as in FIG. 15C, the control unit 110 may display the additional information saying that the number of new stored images is 12, for example, as "12 New images" 714. And, an end effect corresponding to the additional information such as "12 New images" 714 may be displayed at a tail end 716 of the image corresponding to the region where the at least one object to be converted does not exist anymore. Thus, according to the present exemplary embodiment, there is an advantage in that when a gesture that scrolls the image is detected again after the end effect has been removed, it is possible to intuitively notify the user that the scroll for the image has been ended and concurrently, to inform the user of the additional information including the information associated with the currently executed application.

FIGS. 16A to 17B illustrate scenes that display an end effect according to a third example of an exemplary embodiment of the present invention.

Referring to FIG. 9 again, a mobile apparatus control method for displaying an end effect according to another exemplary embodiment of the present invention displays at least one object on a first layer on the touch screen in step S210. That is, the control unit 110 of the mobile apparatus 100 displays at least one object on the first layer on the touch screen. And, the at least one object may be formed as a web page, contact information, an image, a text, a video, an audio, an icon, items, a tab, or a combination thereof. For example, the at least one object may be at least one image. And, the at least one image may form a gallery.

Referring to FIG. 16A, the control unit 110 of the mobile apparatus 100 displays at least one object formed as a gallery on the first layer of the touch screen 190. That is, the control unit 110 may execute a gallery application, and the image 800 may be displayed on the first layer on the touch screen 190 through the execution of the gallery application.

Next, a first gesture that converts the at least one object is detected in step S220. At this time, the conversion may be any one of a scroll, a magnification and a reduction. For example, the conversion may be magnification. At this time, the magnification refers to an operation that magnifies and displays the image 800 on the touch screen. And, the first gesture may be a touch input that converts the at least one object. In addition, the touch input may be at least one of a touch, a drag or a flick that converts the at least one object. For example, referring to FIG. 16A, the control unit 110 may detect a first gesture 802 that magnifies an image 800 which is the at least one object. That is, the control unit 110 may detect a touch input such as double touch 802 that magnifies the image 800. That is, as in FIG. 16A, the control unit 110 may detect the touch input 802 such as double touch that magnifies the at least one object which is the image 800.

Next, the at least one object is converted in response to the first gesture in step S230. For example, as in FIG. 16B, the conversion preset to correspond to the touch input such as double touch may be magnification. Accordingly, the control unit 110 may magnify at least one object such as an image in response to a touch input such as double touch. That is, as in FIG. 16B, the control unit 110 may magnify the image 800 in response to the touch input 802 such as double touch.

Next, it is detected that the conversion for the at least one object is ended in step S240. The control unit 110 may detect that the conversion for the at least one object executed in step S230 is ended.

For example, as in FIG. 16B, while the magnification for the at least one object which is the image is being performed, the control unit 110 may detect that the magnification for the image 800 is ended. That is, when the image 800 to be magnified does not exist anymore, the control unit 110 may detect that the magnification for the image is ended. That is, in FIG. 16A, since the image 800 to be magnified exists, marginal spaces 820 and 822 are displayed. However, in FIG. 16B, since the image 800 to be magnified does not exist anymore, no marginal space is displayed. Accordingly, when the image 800 to be magnified does not exist and, thus, no marginal space exists, the control unit 110 may detect that the magnification for the image 800 has been ended.

Next, when the conversion for the at least one object is ended, the end effect is displayed on the second layer on the touch screen in step S250.

For example, the control unit 110 may display, as the end effect, a message saying that "at least one object to be converted does not exist anymore" on the second layer on the touch screen, for example, as "No more item for you" 804 as in FIG. 16C. That is, the control unit 110 may display the message such as "No more item for you" 804 to mean that the image to be magnified does not exist anymore. And, the effect corresponding to the message such as "No more item for you" 804 may be displayed at a tail end 806 of the image corresponding to the region where the at least one object to be converted does not exist anymore. Therefore, according to the present exemplary embodiment, there is an advantage in that the message saying that the image to be magnified does not exist anymore is displayed so that the user may be intuitively notified that the magnification for the image has been ended.

Next, the end effect is removed from the touch screen in step S260. For example, the control unit 110 may remove the end effect corresponding to the message such as "No more item for you" 704 displayed on the second layer in FIG. 17A from the touch screen 190.

Next, the second gesture that converts the at least one object is detected in step S270. For example, after the end effect has been removed in step S260 as in FIG. 17A, the control unit 110 may detect the second gesture corresponding to the touch input 812 such as double touch that magnifies the at least one object which is the image.

Next, the end effect is displayed on the second layer on the touch screen in step S280.

Figure 17A:
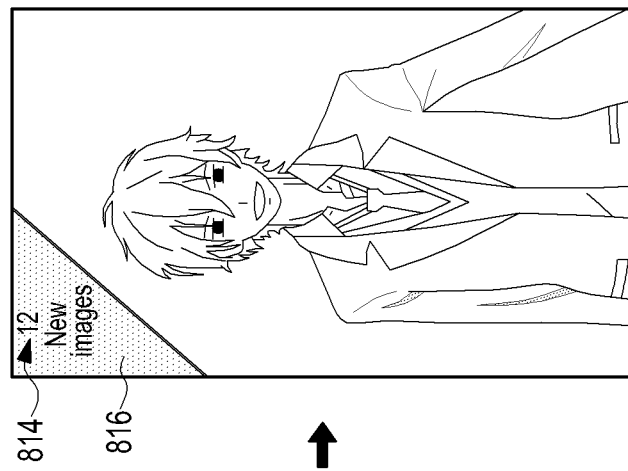
Figure 17B:
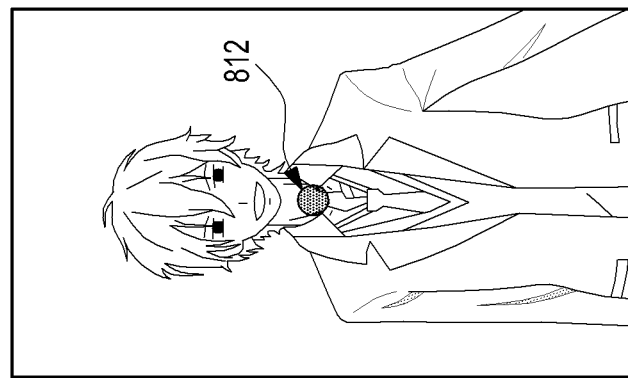

For example, the control unit 110 may display additional information as the end effect as in FIG. 17B. And, the additional information may be information associated with a currently executed application. As in FIG. 17B, the control unit 110 may display the information associated with the gallery application which is the currently executed application. For example, the information associated with the gallery application may be the number of images which are newly stored. Accordingly, as in FIG. 17B, the control unit 110 may display the additional information saying that the number of new stored images is 12, for example, as "12 New images" 814. And, an end effect corresponding to the additional information such as "12 New images" 814 may be displayed at a tail end of the image corresponding to the region 816 where the at least one object to be converted does not exist anymore. Thus, according to the present exemplary embodiment, there is an advantage in that when a gesture that magnifies the image is detected again after the end effect has been removed, it is possible to intuitively notify the user that the magnification for the image has been ended, and concurrently, to inform the user of the additional information including the information associated with the currently executed application.

Figures 18A, 18B, 18C:
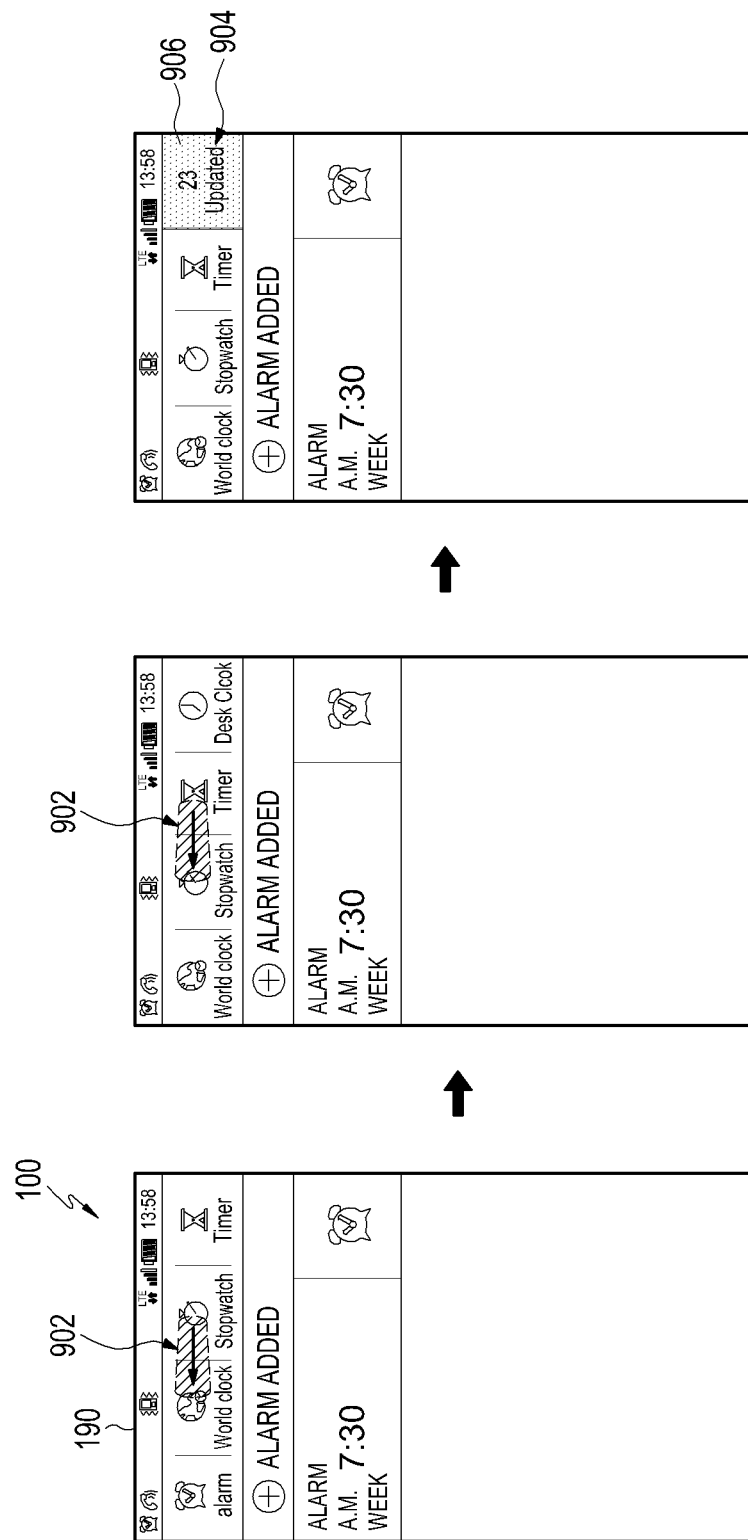
FIGS. 18A to 18C illustrate scenes that display an end effect according to a fourth example of an exemplary embodiment of the present invention.

FIGS. 18A to 18C illustrate scenes that display an end effect according to a fourth example of an exemplary embodiment of the present invention.

Referring to FIG. 4 again, a mobile apparatus control method for displaying an end effect according to another exemplary embodiment of the present invention displays at least one object on a first layer on the touch screen in step S110. That is, the control unit 110 of the mobile apparatus 100 displays at least one object on the first layer on the touch screen. And, the at least one object may be formed as a web page, contact information, an image, a text, a video, an audio, an icon, an item, a tab, or a combination thereof. For example, the at least one object may be at least one tab. Also, the at least one tab may form a tab list.

Referring to FIG. 18A, the control unit 110 of the mobile apparatus 100 displays at least one object formed as the tab on the first layer on the touch screen 190. That is, the control unit 110 may execute a clock application, and the tab may be displayed on the first layer on the touch screen 190 through the execution of the clock application.

Next, a first gesture that converts the at least one object is detected in step S120. At this time, the conversion may be any one of a scroll, a magnification, and a reduction. For example, the conversion may be the scroll. At this time, the scroll refers to an operation that moves the at least one object to be displayed on a touch screen. Also, the first gesture may be a touch input that converts the at least one object. In addition, the touch input may be at least one of a touch, a drag or a flick that converts the at least one object. For example, referring to FIG. 18A, the control unit 110 may detect the first gesture 902 that scrolls a tab which is the at least one object. That is, the control unit 110 may detect a touch input such as a drag or a flick that scrolls the tab. That is, as in FIG. 18A, the control unit 110 may detect a touch input 902 such as a drag or a flick that scrolls the at least one object which is the tab to the left side of the touch screen 190.

Next, the at least one object is converted in response to the first gesture in step S130. For example, as in FIG. 18B, the conversion preset to correspond to a touch input such as a drag or a flick may be the scroll. Accordingly, the control unit 110 may scroll at least one object such as a tab in response to a touch input such as a drag or a flick. That is, as illustrated in FIG. 18B, the control unit 110 may scroll the tab to the left side of the touch screen 190 in response to the touch input 902 such as a leftward drag or flick.

Next, it is detected that the conversion for the at least one object is ended in step S140. The control unit 110 may detect that the conversion for the at least one object executed in step S130 as described above is ended.

For example, as in FIG. 18B, while the scroll for the at least one object which is the tab is being performed, the control unit 110 may detect that the scroll for the tab is ended. That is, the control unit 110 may detect that the scroll for the tab is ended when the tab to be displayed does not exist anymore.

Next, when the conversion for the at least one object is ended, the end effect is displayed on the second layer on the touch screen in step S150.

For example, the control unit 110 may display additional information as the end effect as in FIG. 18C. And, the additional information may be information associated with the current status of the mobile apparatus. As in FIG. 18C, the control unit 110 may display the information associated with the current status of the mobile apparatus as the end effect. For example, the information associated with the current status of the mobile apparatus may be the number of the applications of which the update has been completed. Accordingly, as in FIG. 18C, the control unit 110 may display the additional information saying that the number of the applications of which the update has been completed is 23 as "23 updated" 904. And, the end effect corresponding to the additional information such as "23 updated" 904 at the right side 906 of the tab which corresponds to the region where the at least one object to be converted does not exist anymore. Therefore, according to the present exemplary embodiment, there is an advantage in that the end effect including the information associated with the current status of the mobile apparatus is displayed so that the user may be intuitively notified that the scroll for the tab has been ended, and concurrently, be informed of the additional information including the information associated with the currently executed application.

Figures 19A, 19B, 19C:
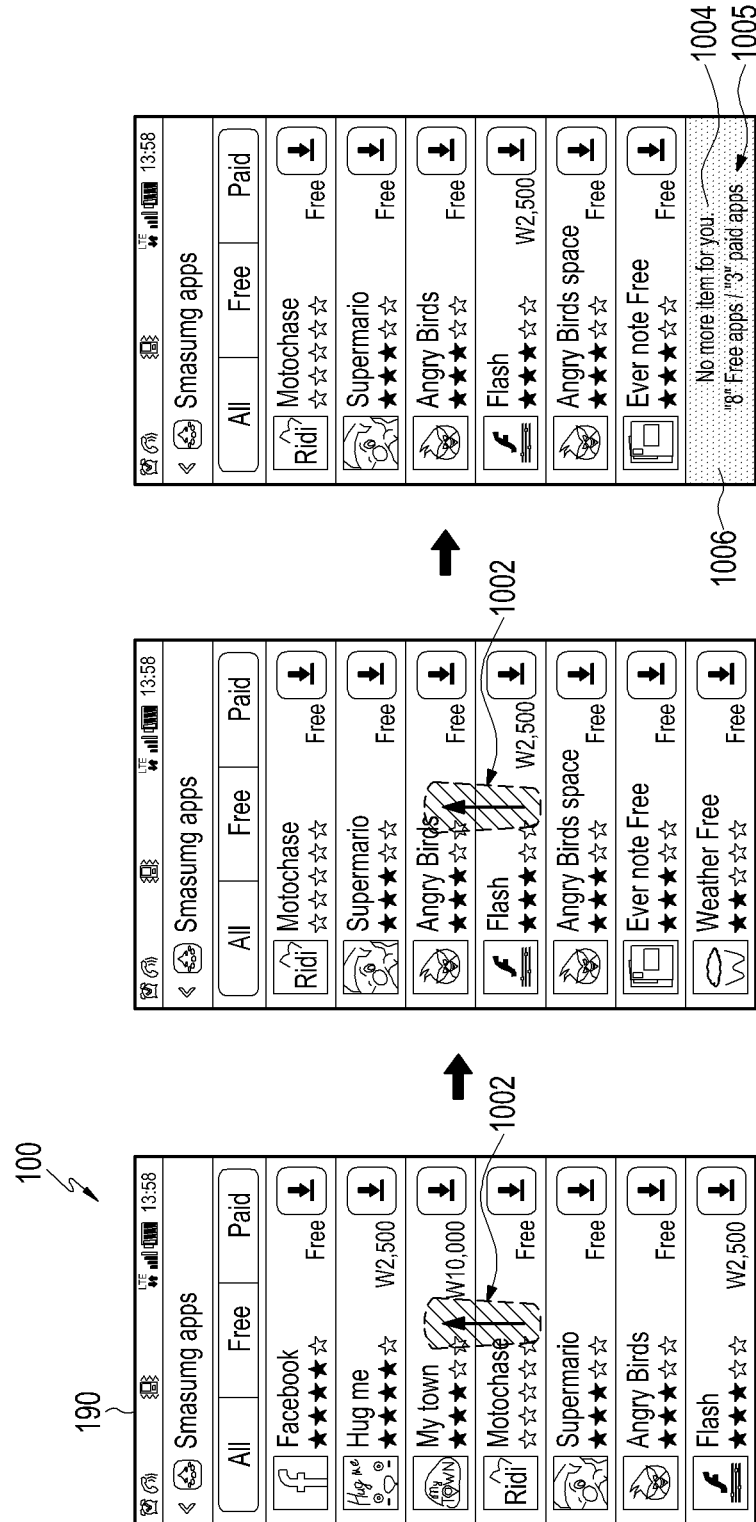
FIGS. 19A to 19C illustrate scenes that display an end effect according to a fifth example of an exemplary embodiment of the present invention.

FIGS. 19A to 19C illustrate scenes that display an end effect according to a fifth example of an exemplary embodiment of the present invention.

Referring to FIG. 4 again, a mobile apparatus control method for displaying an end effect according to another exemplary embodiment of the present invention displays at least one object on a first layer on the touch screen in step S110. That is, the control unit 110 of the mobile apparatus 100 displays at least one object on the first layer on the touch screen. And, the at least one object may be formed as a web page, contact information, an image, a text, a video, an audio, an icon, an item, a tab, or a combination thereof. For example, the at least one object may be at least one item. Also, the at least one tab may form an item list.

Referring to FIG. 19A, the control unit 110 of the mobile apparatus 100 displays at least one object formed as the item on the first layer on the touch screen 190. That is, the control unit 110 may execute an app purchase application, and the item may be displayed on the first layer on the touch screen 190 through the execution of the app purchase application.

Next, a first gesture that converts the at least one object is detected in step S120. At this time, the conversion may be any one of a scroll, a magnification, and a reduction. For example, the conversion may be the scroll. At this time, the scroll refers to an operation that moves the at least one object to be displayed on a touch screen. Also, the first gesture may be a touch input that converts the at least one object. In addition, the touch input may be at least one of a touch, a drag or a flick that converts the at least one object. For example, referring to FIG. 19A, the control unit 110 may detect the first gesture 1002 that scrolls an item which is the at least one object. That is, the control unit 110 may detect a touch input such as a drag or a flick that scrolls the item. That is, as in FIG. 19A, the control unit 110 may detect a touch input 1002 such as a drag or a flick that scrolls the at least one object which is the item to the top end of the touch screen 190.

Next, the at least one object may be converted in response to the first gesture in step S130. For example, as in FIG. 19B, the conversion preset to correspond to the touch input such as a drag or a flick may be the scroll. Accordingly, the control unit 110 may scroll at least one object such as the item in response to the touch input such as a drag or a flick. That is, as in FIG. 19B, the control unit 110 may scroll the item to the top end of the touch screen 190 in response to the touch input 1002 such as an upward drag or flick.

Next, it is detected that the conversion for the at least one object is ended in step S140. The control unit 110 may detect that the conversion for the at least one object executed in step S130 as described above is ended.

For example, as in FIG. 19B, while the scroll for the at least one object which is the item is being performed, the control unit 110 may detect that the scroll for the item is ended. That is, the control unit 110 may detect that the scroll for the item is ended when the item to be displayed does not exist anymore.

Next, when the conversion for the at least one object is ended, the end effect is displayed on the second layer on the touch screen in step S150.

For example, the control unit 110 may display, as the end effect, a message saying that "the at least one object to be converted does not exist anymore" on the second layer on the touch screen, for example, as "No more item for you" 1004 as in FIG. 19C. That is, the message such as "No more item for you" 1004 may be displayed as the end effect to mean that the item to be scrolled does not exist anymore. In addition, the end effect corresponding to the message such as "No more item for you" 1004 may be displayed at the lower end 1006 of the item list which corresponds to the region where the at least one object to be converted does not exist anymore. According to the present invention, there is an advantage in that the message saying that the item to be scrolled does not exist anymore is displayed so that the user may be intuitively notified that the scroll for the item has been ended.

Also, for example, the control unit 110 may display additional information as the end effect as in FIG. 19C. And, the additional information may be information associated with a currently executed application. As in FIG. 19C, the control unit 110 may display the information associated with the currently executed application as the end effect. For example, the information associated with the currently executed application may be the number of free apps and the number of paid apps in the app purchase application. Accordingly, as in FIG. 19C, the control unit 110 may display the additional information saying that the number of the free apps and the number the paid apps are 8 and 3, respectively, as "8" Free apps/"3" paid apps" 1005. And, the end effect corresponding to the additional information such as "8" Free apps/"3" paid apps" 1005 at the lower end 1006 of the item list which corresponds to the region where the at least one object to be converted does not exist anymore.

Therefore, according to the present exemplary embodiment, there is an advantage in that the end effect including the information associated with the currently executed application is displayed so that the user may be intuitively notified that the scroll for the item has been ended, and concurrently, be informed of the additional information including the information associated with the currently executed application.

FIGS. 20A to 20C illustrate scenes that display an end effect according to a sixth example of an exemplary embodiment of the present invention.

Referring to FIG. 4 again, a mobile apparatus control method for displaying an end effect according to another exemplary embodiment of the present invention displays at least one object on a first layer on the touch screen in step S110. That is, the control unit 110 of the mobile apparatus 100 displays at least one object on the first layer on the touch screen. And, the at least one object may be formed as a web page, contact information, an image, a text, a video, an audio, an icon, an item, a tab, or a combination thereof. For example, the at least one object may be at least one video. Also, the at least one audio may form a video list.

Referring to FIG. 20A, the control unit 110 of the mobile apparatus 100 displays at least one object formed as the video on the first layer on the touch screen 190. That is, the control unit 110 may execute an app purchase application, and the video corresponding to an app execution screen may be displayed on the first layer on the touch screen 190 through the execution of the app purchase application.

Next, a first gesture that converts the at least one object is detected in step S120. At this time, the conversion may be any one of a scroll, a magnification, and a reduction. For example, the conversion may be the scroll. At this time, the scroll refers to an operation that moves the at least one object to be displayed on a touch screen. Also, the first gesture may be a touch input that converts the at least one object. In addition, the touch input may be at least one of a touch, a drag or a flick that converts the at least one object. For example, referring to FIG. 20A, the control unit 110 may detect the first gesture 1102 that scrolls a video which is the at least one object. That is, the control unit 110 may detect a touch input such as a drag or a flick that scrolls the at least one object which is the video. That is, as in FIG. 20A, the control unit 110 may detect a touch input 1102 such as a drag or a flick that scrolls the at least one object which is the video to the right side of the touch screen 190.

Next, the at least one object is converted in response to the first gesture in step S130. For example, as in FIG. 20B, the conversion preset to correspond to the touch input such as a drag or a flick may be the scroll. Accordingly, the control unit 110 may scroll the at least one object such as a video in response to the touch input such as a drag or a flick. That is, as in FIG. 20B, the control unit 110 may scroll the video to the right side of the touch screen 190 in response to the touch input 1102 such as a rightward drag or flick.

Next, it is detected that the conversion for the at least one object is ended in step S140. The control unit 110 may detect that the conversion for the at least one object executed in step S130 as described above is ended.

For example, as in FIG. 20B, while the scroll for the at least one object which is the video is being performed, the control unit 110 may detect that the scroll for the video is ended. That is, the control unit 110 may detect that the scroll for the video is ended when the video to be displayed does not exist anymore.

Next, when the conversion for the at least one object is ended, the end effect is displayed on the second layer on the touch screen in step S150.

For example, the control unit 110 may display, as the end effect, a message saying that "the at least one object to be converted does not exist anymore" on the second layer on the touch screen, for example, as "No item" 1104 as in FIG. 20C. That is, the message such as "No more item for you" 1104 may be displayed as the end effect to mean that the video to be scrolled does not exist anymore. In addition, the end effect corresponding to the message such as "No item" 1104 may be displayed at the left side 1106 of the video list which corresponds to the region where the at least one object to be converted does not exist anymore. According to the present exemplary embodiment, there is an advantage in that the message saying that the video to be scrolled does not exist anymore is displayed so that the user may be intuitively notified that the scroll for the video has been ended.

Also, for example, the control unit 110 may display additional information as the end effect as in FIG. 20C. And, the additional information may be information associated with a currently executed application. As in FIG. 20C, the control unit 110 may display the information associated with the currently executed application as the end effect. For example, the information associated with the currently executed application may be the number of persons who make a choice as liking the app. Accordingly, as in FIG. 20C, the control unit 110 may display the additional information saying that the number of the persons who make a choice as liking the app is 138, as ""138" Like this" 1105. And, the end effect corresponding to the additional information such as ""138" Like this" 1105 may be displayed at the left side 1106 of the video list which corresponds to the region where the at least one object to be converted does not exist anymore.

Therefore, according to the present exemplary embodiment, there is an advantage in that the end effect including the information associated with the currently executed application is displayed so that the user may be intuitively notified that the scroll for the video has been ended, and concurrently, be informed of the additional information including the information associated with the currently executed application.

FIGS. 21A to 21C illustrate scenes that display an end effect according to a seventh example of an exemplary embodiment of the present invention.

Referring to FIG. 4 again, a mobile apparatus control method for displaying an end effect according to another exemplary embodiment of the present invention displays at least one object on a first layer on the touch screen in step S110. That is, the control unit 110 of the mobile apparatus 100 displays at least one object on the first layer on the touch screen. And, the at least one object may be formed as a web page, contact information, an image, a text, a video, an audio, an icon, an item, a tab, or a combination thereof. For example, the at least one object may be at least one audio. Also, the at least one audio may form an audio list.

Referring to FIG. 21A, the control unit 110 of the mobile apparatus 100 displays at least one object formed as the audio on the first layer on the touch screen 190. That is, the control unit 110 may execute a music application, and may display the audio on the first layer on the touch screen 190 through the execution of the music application.

Next, a first gesture that converts the at least one object is detected in step S120. At this time, the conversion may be any one of a scroll, a magnification, and a reduction. For example, the conversion may be the scroll. At this time, the scroll refers to an operation that moves the at least one object to be displayed on a touch screen. Also, the first gesture may be a touch input that converts the at least one object. In addition, the touch input may be at least one of a touch, a drag or a flick that converts the at least one object. For example, referring to FIG. 21A, the control unit 110 may detect the first gesture 1202 that scrolls an audio which is the at least one object. That is, the control unit 110 may detect a touch input such as a drag or a flick that scrolls the at least one object which is the audio. That is, as in FIG. 21A, the control unit 110 may detect a touch input 1202 such as a drag or a flick that scrolls the at least one object which is the audio downward on the touch screen 190.

Next, the at least one object is converted in response to the first gesture in step S130. For example, as in FIG. 21B, the conversion preset to correspond to the touch input such as a drag or a flick may be the scroll. Accordingly, the control unit 110 may scroll the at least one object such as an audio in response to the touch input such as a drag or a flick. That is, as in FIG. 21B, the control unit 110 may scroll the audio downward on the touch screen 190 in response to the touch input 1202 such as a downward drag or flick.

Next, it is detected that the conversion for the at least one object is ended in step S140. The control unit 110 may detect that the conversion for the at least one object executed in step S130 as described above is ended.

For example, as in FIG. 21B, while the scroll for the at least one object which is the audio is being performed, the control unit 110 may detect that the scroll for the audio is ended. That is, the control unit 110 may detect that the scroll for the audio is ended when the audio to be displayed does not exist anymore.

Next, when the conversion for the at least one object is ended, the end effect is displayed on the second layer on the touch screen in step S150.

For example, the control unit 110 may display, as the end effect, a message saying that "the at least one object to be converted does not exist anymore" on the second layer on the touch screen, for example, as "No more item for you" 1204 as in FIG. 21C. That is, the message such as "No more item for you" 1204 may be displayed as the end effect to mean that the audio to be scrolled does not exist anymore. In addition, the end effect corresponding to the message such as "No more item for you" 1204 may be displayed at the top end 1206 of the audio list which corresponds to the region where the at least one object to be converted does not exist anymore. According to the present exemplary embodiment, there is an advantage in that the message saying that the audio to be scrolled does not exist anymore is displayed so that the user may be intuitively notified that the scroll for the audio has been ended.

Also, for example, the control unit 110 may display additional information as the end effect as in FIG. 21C. And, the additional information may be information associated with a currently executed application. As in FIG. 21C, the control unit 110 may display the information associated with the currently executed application as the end effect. For example, the information associated with the currently executed application may be the title of a currently reproduced audio. Accordingly, as in FIG. 21C, the control unit 110 may display the additional information saying that the title of the currently reproduced audio is "Sexy baby" as "Recent music is "Sexy baby"" 1205. And, the end effect corresponding to the additional information such as "Recent music is "Sexy baby"" 1205 may be displayed at the top end 1206 of the audio list which corresponds to the region where the at least one object to be converted does not exist anymore.

Therefore, according to the present exemplary embodiment, there is an advantage in that the end effect including the information associated with the currently executed application is displayed so that the user may be intuitively notified that the scroll for the audio has been ended, and concurrently, be informed of the additional information including the information associated with the currently executed application.

Figures 22A, 22B, 22C:
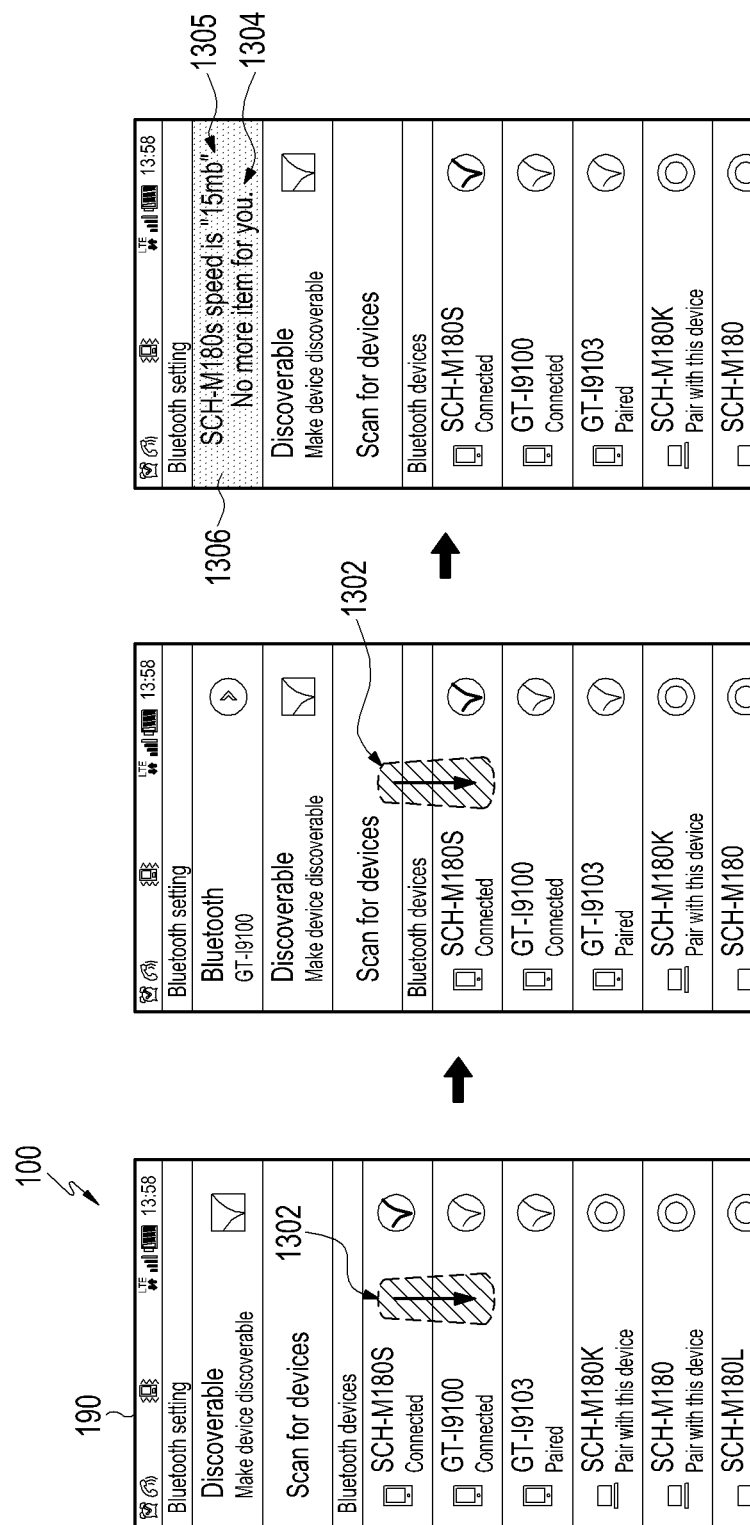
FIGS. 22A to 22C illustrate scenes that display an end effect according to an eighth example of an exemplary embodiment of the present invention.

FIGS. 22A to 22C illustrate scenes that display an end effect according to an eighth example of an exemplary embodiment of the present invention.

Referring to FIG. 4 again, a mobile apparatus control method for displaying an end effect according to another exemplary embodiment of the present invention displays at least one object on a first layer on the touch screen in step S110. That is, the control unit 110 of the mobile apparatus 100 displays at least one object on the first layer on the touch screen. And, the at least one object may be formed as a web page, contact information, an image, a text, a video, an audio, an icon, an item, a tab, or a combination thereof. For example, the at least one object may be at least one item. Also, the at least one item may form an item list.

Referring to FIG. 22A, the control unit 110 of the mobile apparatus 100 displays at least one object formed as the item on the first layer on the touch screen 190. That is, the control unit 110 may execute a Bluetooth setting application, and may display an item associated with the Bluetooth on the first layer on the touch screen 190 through the execution of the Bluetooth setting application.

Next, a first gesture that converts the at least one object is detected in step S120. At this time, the conversion may be any one of a scroll, a magnification, and a reduction. For example, the conversion may be the scroll. At this time, the scroll refers to an operation that moves the at least one object to be displayed on a touch screen. Also, the first gesture may be a touch input that converts the at least one object. In addition, the touch input may be at least one of a touch, a drag or a flick that converts the at least one object. For example, referring to FIG. 22A, the control unit 110 may detect the first gesture 1302 that scrolls an item which is the at least one object. That is, the control unit 110 may detect a touch input such as a drag or a flick that scrolls the at least one object which is the item. That is, as in FIG. 22A, the control unit 110 may detect a touch input 1302 such as a drag or a flick that scrolls the at least one object which is the item downward on the touch screen 190.

Next, the at least one object is converted in response to the first gesture in step S130. For example, as in FIG. 22B, the conversion preset to correspond to the touch input such as a drag or a flick may be the scroll. Accordingly, the control unit 110 may scroll the at least one object such as an item in response to the touch input such as a drag or a flick. That is, as in FIG. 22B, the control unit 110 may scroll the item downward on the touch screen 190 in response to the touch input 1302 such as a downward drag or flick.

Next, it is detected that the conversion for the at least one object is ended in step S140. The control unit 110 may detected that the conversion for the at least one object executed in step S130 as described above is ended.

For example, as in FIG. 22B, while the scroll for the at least one object which is the item is being performed, the control unit 110 may detect that the scroll for the item is ended. That is, the control unit 110 may detect that the scroll for the item has been ended when the item to be displayed does not exist anymore.

Next, when the conversion for the at least one object is ended, the end effect is displayed on the second layer on the touch screen in step S150.

For example, the control unit 110 may display, as the end effect, a message saying that "the at least one object to be converted does not exist anymore" on the second layer on the touch screen, for example, as "No more item for you" 1304 as in FIG. 22C. That is, the message such as "No more item for you" 1304 may be displayed as the end effect to mean that the item to be scrolled does not exist anymore. In addition, the end effect corresponding to the message such as "No more item for you" 1304 may be displayed at the top end 1306 of the item list which corresponds to the region where the at least one object to be converted does not exist anymore. Therefore, according to the present exemplary embodiment, there is an advantage in that the message saying that the item to be scrolled does not exist anymore is displayed so that the user may be intuitively notified that the scroll for the item has been ended.

Also, for example, the control unit 110 may display additional information as the end effect as in FIG. 22C. And, the additional information may be information associated with a currently executed application. As in FIG. 22C, the control unit 110 may display the information associated with the currently executed application as the end effect. For example, the information associated with the currently executed application may be the current speed of the Bluetooth. Accordingly, as in FIG. 22C, the control unit 110 may display the additional information saying that the current speed of the Bluetooth is 15 mb as "SCH-M180's speed is "15 mb"" 1305. And, the end effect corresponding to the additional information such as "SCH-M180's speed is "15 mb"" 1305 may be displayed at the top end 1306 of the item list which corresponds to the region where the at least one object to be converted does not exist anymore.

Therefore, according to the present exemplary embodiment, there is an advantage in that the end effect including the information associated with the currently executed application is displayed so that the user may be intuitively notified that the scroll for the item has been ended, and concurrently, be informed of the additional information including the information associated with the currently executed application.

FIGS. 23A to 23C illustrate scenes that display an end effect according to a ninth example of an exemplary embodiment of the present invention.

Referring to FIG. 4 again, a mobile apparatus control method for displaying an end effect according to another exemplary embodiment of the present invention displays at least one object on a first layer on the touch screen in step S110. That is, the control unit 110 of the mobile apparatus 100 displays at least one object on the first layer on the touch screen. And, the at least one object may be formed as a web page, contact information, an image, a text, a video, an audio, an icon, an item, a tab, or a combination thereof. For example, the at least one object may be a web page.

Referring to FIG. 23A, a screen where contents for memorization to be described below are selected is illustrated. The control unit 110 of the mobile apparatus 100 may detect a selection for an icon displayed on the touch screen 190 to receive an input of the selection for contents for memorization. For example, as in FIG. 23A, the control unit 110 may detect icons according to TOEIC VOCA 1422 and TOEFL VOCA 1424 in Vocabulary 1420 by setting Study 1410 in an end effect setting window (End Effect Settings) 1400. Also, in Sentence 1430, languages of JAPAN 1432 and CHINA 1434 may be included.

Referring to FIG. 23B, the control unit 110 of the mobile apparatus 110 displays at least one object formed as a web page on the first layer on the touch screen. That is, the control unit 110 may execute a web browser application and may display the web page on the first layer on the touch screen 190 through the execution of the web browser application.

Next, a first gesture that converts the at least one object is detected in step S120. At this time, the conversion may be any one of a scroll, a magnification, and a reduction. For example, the conversion may be the scroll. At this time, the scroll refers to an operation that moves the at least one object to be displayed on a touch screen. Also, the first gesture may be a touch input that converts the at least one object. In addition, the touch input may be at least one of a touch, a drag or a flick that converts the at least one object. For example, referring to FIG. 23B, the control unit 110 may detect the first gesture 1402 that scrolls a web page which is the at least one object. That is, the control unit 110 may detect a touch input such as a drag or a flick that scrolls the at least one object which is the web page. That is, as in FIG. 23B, the control unit 110 may detect a touch input 1402 such as a drag or a flick that scrolls the at least one object which is the web page downward on the touch screen 190.

Next, the at least one object is converted in response to the first gesture in step S130. For example, as in FIG. 23B, the conversion preset to correspond to the touch input such as a drag or a flick may be the scroll. Accordingly, the control unit 110 may scroll the at least one object such as a web page in response to the touch input such as a drag or a flick. That is, as in FIG. 23B, the control unit 110 may scroll the web page downward on the touch screen 190 in response to the touch input 1402 such as downward a drag or a flick.

Next, it is detected that the conversion for the at least one object is ended in step S140. The control unit 110 may detect that the conversion for the at least one object executed in step S130 as described above is ended.

For example, as in FIG. 23B, while the scroll for the at least one object which is the web page is being performed, the control unit 110 may detect that the scroll for the web page is ended. That is, the control unit 110 may detect that the scroll for the web page has been ended when the web page to be displayed does not exist anymore.

Next, when the conversion for the at least one object is ended, the end effect is displayed on the second layer on the touch screen in step S150.

For example, the control unit 110 may display, as the end effect, a message saying that "the at least one object to be converted does not exist anymore" on the second layer on the touch screen, for example, as "No more item for you" 1404 as in FIG. 23C. That is, the message such as "No more item for you" 1404 may be displayed as the end effect to mean that the web page to be scrolled does not exist anymore. In addition, the end effect corresponding to the message such as "No more item for you" 1404 may be displayed at the top end 1406 of the web page which corresponds to the region where the at least one object to be converted does not exist anymore. Therefore, according to the present exemplary embodiment, there is an advantage in that the message saying that the item to be scrolled does not exist anymore is displayed so that the user may intuitively notified that the scroll for the web page has been ended.

Also, for example, the control unit 110 may display additional information as the end effect as in FIG. 23C. And, the additional information may be information associated with contents for memorization. As in FIG. 23C, the control unit 110 may display the contents for memorization as the end effect. For example, the contents for memorization may be may be TOEIC VOCA and TOEFFL VOCA as selected in FIG. 23A. Accordingly, as in FIG. 23C, the control unit 110 may display the additional information, TOEIC VOCA and TOEFFL VOCA which are the contents for memorization as "Eradicate" 1405. And, the end effect corresponding to the additional information such as "Eradicate"" 1405 may be displayed at the top end 1406 of the web page which corresponds to the region where the at least one object to be converted does not exist anymore.

Therefore, according to the present exemplary embodiment, there is an advantage in that the end effect including the additional information associated with the contents for memorization is displayed so that the user may be intuitively notified that the scroll for the web page has been ended, and concurrently, be informed of the additional information including the information associated with the currently executed application.

It will be appreciated that the exemplary embodiments of the present invention may be implemented in a form of hardware, software, or a combination of hardware and software. Such arbitrary software may be stored, for example, in a volatile or non-volatile storage device such as an ROM, or, for example, a memory such as an RAM, a memory chip, a memory device or an integrated circuit, or a storage medium such as a Compact Disc (CD), a Digital Versatile Disc (DVD), a magnetic disc or a magnetic tape that may be optically or magnetically recorded and readable with a machine (for example, a computer) regardless of whether the software is erasable or rewritable or not. Also, it will be appreciated that the exemplary embodiments of the present invention may be implemented by a computer or a portable terminal which includes a control unit and a memory, in which the memory may be an example of a non-transitory storage medium that is readable by a machine that is suitable for storing one or more programs that include instructions for implementing the exemplary embodiments of the present invention. Accordingly, the present invention includes a program that includes a code for implementing an apparatus or a method defined in any claim in the present specification and a machine (e.g., a computer) readable storage medium that stores such a program. Further, the program may be electronically transmitted through a medium such as a communication signal transferred through wired or wireless connection, and the present invention properly includes that equivalent to the program.

In addition, the above-described electronic apparatus may receive and store the program from a program supply apparatus wiredly or wirelessly connected thereto. The program supply apparatus may include a program that includes instructions to execute the exemplary embodiments of the present invention, a memory that stores information or the like required for the exemplary embodiments of the present invention, a communication unit that conducts wired or wireless communication with the electronic apparatus, and a control unit that transmits a corresponding program to a transmission/reception apparatus in response to the request from the electronic apparatus or automatically.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An electronic device comprising:
a memory to store a plurality of displayable objects;
a touchscreen display; and
a processor configured to:
execute an application to display, via the touchscreen display, an execution screen of the application providing a scrollable region,
arrange, in the scrollable region of the execution screen, the plurality of displayable objects as a sequence of displayable objects,
receive, via the touchscreen display, a first user input for scrolling the scrollable region,
in response to the first user input, scroll the scrollable region to display a portion of the scrollable region in which a displayable object at an end of the sequence of displayable objects is included,
receive, via the touchscreen display after receiving the first user input, a second user input for scrolling the scrollable region in a direction away from an edge of the touchscreen display, and
in response to the second user input, move the displayable object at the end of the sequence of displayable objects in the direction away from the edge of the touchscreen display and display, between the moved displayable object at the end of the sequence of displayable objects and the edge of the touchscreen display, an indication of a total quantity of the plurality of displayable objects.

2. The electronic device of claim 1, wherein the plurality of displayable objects comprises at least one of an image or text.

3. The electronic device of claim 1, wherein at least one of the first user input or the second user input includes a drag or a flick.

4. The electronic device of claim 1, wherein the processor is configured to control to display the indication of the total quantity of the plurality of displayable objects while the second user input is maintained.

5. The electronic device of claim 1, wherein the processor is configured to control to stop displaying the indication of the total quantity of the plurality of displayable objects after the second user input is released.

6. The electronic device of claim 1, wherein the processor is configured to control to present the indication of the total quantity of the plurality of displayable objects in a bar between the moved displayable object and the edge of the touchscreen display.

7. The electronic device of claim 1, wherein the scrollable region is rectangular.

8. The electronic device of claim 1, wherein all of the plurality of displayable objects are rectangular and have the same size.

9. The electronic device of claim 1, wherein the plurality of displayable objects are displayed in a grid.

10. An electronic device comprising:
a memory;
a touchscreen display; and
a processor configured to control to:
store, in the memory, data corresponding to a plurality of displayable objects,
execute an application to display, via the touchscreen display, a user interface screen to provide the plurality of displayable objects in a scrollable region,
receive, via the touchscreen display, a user input to scroll the plurality of displayable objects in the scrollable region of the user interface screen in a specified direction, and
in response to receiving, via the touchscreen display, another user input to scroll in the specified direction after an end of the plurality of displayable objects is reached in the scrollable region of the user interface screen, display, via the touchscreen display, an indication of a total quantity of the plurality of displayable objects between the end of the plurality of displayable objects and an edge of the scrollable region of the user interface screen, the edge of the scrollable region of the user interface screen being spaced apart from the end of the plurality of displayable objects in a direction that is opposite the specified direction.

11. A method for controlling an electronic device, the method comprising:
    storing, in a memory of the electronic device, a plurality of displayable objects;
    executing an application to display, via a touchscreen display of the electronic device, an execution screen of the application providing a scrollable region;
    arranging, in the scrollable region of the execution screen, the plurality of displayable objects as a sequence of displayable objects;
    receiving, via the touchscreen display, a first user input for scrolling the scrollable region,
    in response to the first user input, scrolling the scrollable region to display a portion of the scrollable region in which a displayable object at an end of the sequence of displayable objects is included;
    receiving, via the touchscreen display after receiving the first user input, a second user input for scrolling the scrollable region in a direction away from an edge of the touchscreen display, and
    in response to the second user input, moving the displayable object at the end of the sequence of displayable objects in the direction away from the edge of the touchscreen display and displaying, between the moved displayable object at the end of the sequence of displayable objects and the edge of the touchscreen display, an indication of a total quantity of the plurality of displayable objects.

12. The method of claim 11, wherein the plurality of displayable objects comprises at least one of an image or text.

13. The method of claim 11, wherein at least one of the first user input or the second user input includes a drag or a flick.

14. The method of claim 11, wherein the indication of the total quantity of the plurality of displayable objects is displayed while the second user input is maintained.

15. The method of claim 11, further comprising stopping the displaying of the indication of the total quantity of the plurality of displayable objects after the second user input is released.

16. The method of claim 11, wherein the indication of the total quantity of the plurality of displayable objects is displayed in a bar between the moved displayable object and the edge of the touchscreen display.

17. The method of claim 11, wherein the scrollable region is rectangular.

18. The method of claim 11, wherein all of the plurality of displayable objects are rectangular and have the same size.

19. The method of claim 11, wherein the plurality of displayable objects are displayed in a grid.

20. A method for controlling an electronic device, the method comprising:
    storing, in a memory of the electronic device, data corresponding to a plurality of displayable objects;
    executing an application to display, via a touchscreen display of the of electronic device, a user interface screen to provide the plurality of displayable objects in a scrollable region,
    receiving, via the touchscreen display, a user input to scroll the plurality of displayable objects in the scrollable region of the user interface screen in a specified direction, and
    in response to receiving, via the touchscreen display, another user input to scroll in the specified direction after an end of the plurality of displayable objects is reached in the scrollable region of the user interface screen, displaying, via the touchscreen display, an indication of a total quantity of the plurality of displayable objects between the end of the plurality of displayable objects and an edge of the scrollable region of the user interface screen, the edge of the scrollable region of the user interface screen being spaced apart from the end of the plurality of displayable objects in a direction that is opposite the specified direction.

* * * * *